US008434506B2

(12) United States Patent
Nakamura et al.

(10) Patent No.: US 8,434,506 B2
(45) Date of Patent: May 7, 2013

(54) FLOW CONTROL VALVE AND METHOD FOR MANUFACTURING THE SAME

(75) Inventors: Katsumi Nakamura, Toyota (JP); Shingo Iguchi, Toyota (JP); Yoshiki Ihara, Hino (JP)

(73) Assignees: Taiho Kogyo Co., Ltd., Toyota (JP); Hino Motors, Ltd., Tokyo (JP)

( * ) Notice: Subject to any disclaimer, the term of this patent is extended or adjusted under 35 U.S.C. 154(b) by 319 days.

(21) Appl. No.: 12/997,655

(22) PCT Filed: Jun. 23, 2009

(86) PCT No.: PCT/JP2009/061809
§ 371 (c)(1),
(2), (4) Date: Dec. 13, 2010

(87) PCT Pub. No.: WO2009/157583
PCT Pub. Date: Dec. 30, 2009

(65) Prior Publication Data
US 2011/0089360 A1 Apr. 21, 2011

(30) Foreign Application Priority Data
Jun. 27, 2008 (JP) ................................. 2008-168583

(51) Int. Cl.
*F16K 1/22* (2006.01)
(52) U.S. Cl.
USPC ................... 137/15.25; 137/315.22; 251/305; 251/314; 251/359; 251/367; 251/368
(58) Field of Classification Search .......... 251/305–308, 251/314, 316, 359–362, 366–368; 137/15.18, 137/15.25, 315.17, 315.22–315.24; 29/890.126
See application file for complete search history.

(56) References Cited

U.S. PATENT DOCUMENTS

| | | | | |
|---|---|---|---|---|
| 5,979,872 A | * | 11/1999 | Stearns et al. | 251/367 |
| 6,123,318 A | * | 9/2000 | Forbes et al. | 251/306 |
| 6,193,214 B1 | * | 2/2001 | Schatz | 251/305 |
| 6,338,467 B1 | * | 1/2002 | Mabboux et al. | 251/305 |
| 7,055,800 B2 | * | 6/2006 | Nakamura | 251/305 |

FOREIGN PATENT DOCUMENTS

| | | |
|---|---|---|
| EP | 1 593 887 A1 | 11/2005 |
| EP | 1 705 409 A1 | 9/2006 |

(Continued)

OTHER PUBLICATIONS

Extended European Search Report issued in European Application No. 09770293.0 on Oct. 19, 2011.

(Continued)

*Primary Examiner* — John Bastianelli
(74) *Attorney, Agent, or Firm* — Oliff & Berridge, PLC

(57) ABSTRACT

A flow control valve in which corrosion is less likely to occur in the vicinity of a radial step portion in a gas passage of a housing and a method for manufacturing the same are provided. A flow control valve includes: a housing formed with a gas passage including a first cylinder member accommodating portion, a second cylinder member accommodating portion, and a radial step portion; a first cylinder member accommodated in the first cylinder member accommodating portion; a second cylinder member accommodated in the second cylinder member accommodating portion; and a valve body that is rotatably arranged inside the first cylinder member and the second cylinder member in the radial direction. The housing is formed of cast iron. At least surfaces of the first cylinder member and the second cylinder member are formed of a highly corrosion resistant material. At least one of a first axial end surface and a second axial end surface includes an opposing portion that opposes the radial step portion in the axial direction. A gas seal structure is arranged between the opposing portion and the radial step portion.

7 Claims, 27 Drawing Sheets

FOREIGN PATENT DOCUMENTS

| | | |
|---|---|---|
| JP | A-55-152964 | 11/1980 |
| JP | A-2004-263723 | 9/2004 |
| JP | A-2007-285311 | 11/2007 |
| JP | A-2007-303434 | 11/2007 |
| JP | A-2008-25802 | 2/2008 |
| JP | A-2008-75741 | 4/2008 |

OTHER PUBLICATIONS

International Search Report issued in International Application No. PCT/JP2009/061809 on Jul. 21, 2009 (with translation).

International Preliminary Report on Patentability issued in International Application No. PCT/JP2009/061809 on Feb. 8, 2011 (with translation).

Oct. 16, 2012 Office Action issued in Japanese Patent Application No. 2008-168583 (with translation.).

Aug. 21, 2012 Office Action issued in Korean Patent Application No. 2010-7029149 (with translation.).

Jul. 27, 2012 Office Action issued in Chinese Patent Application No. 200980124614.8 (with translation.).

Feb. 19, 2013 Office Action issued in Korean Patent Application No. 2010-7029149; with translation.

* cited by examiner

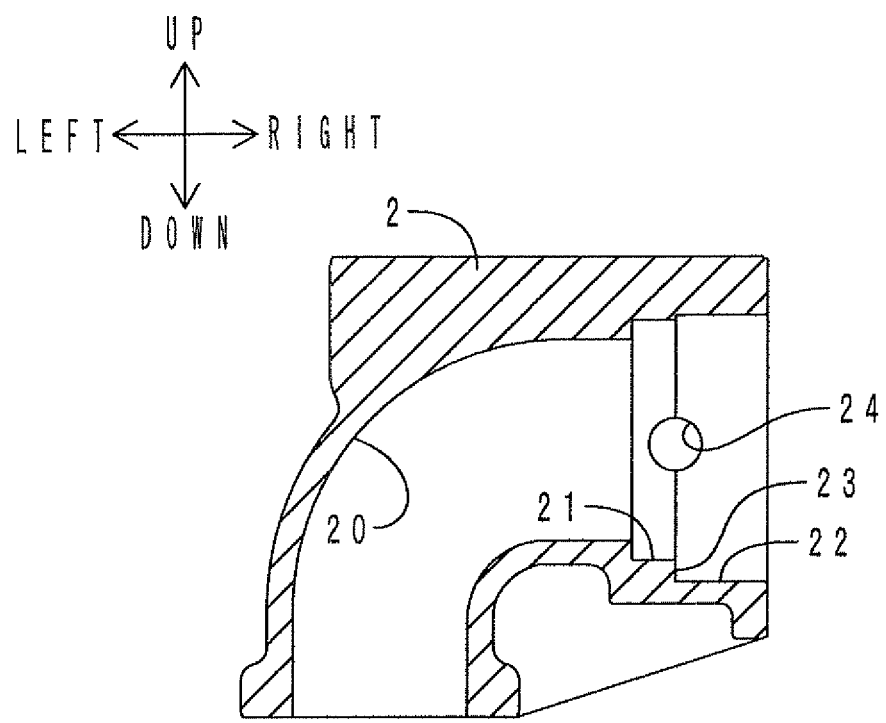
F I G. 5

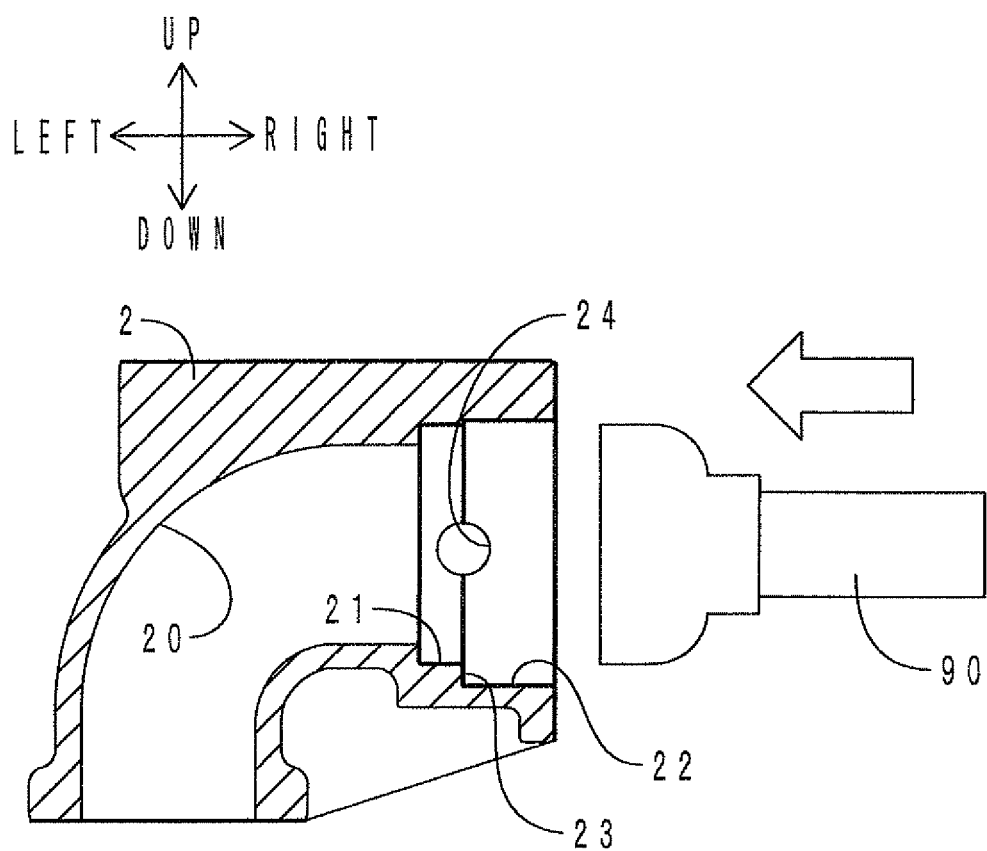
F I G. 6

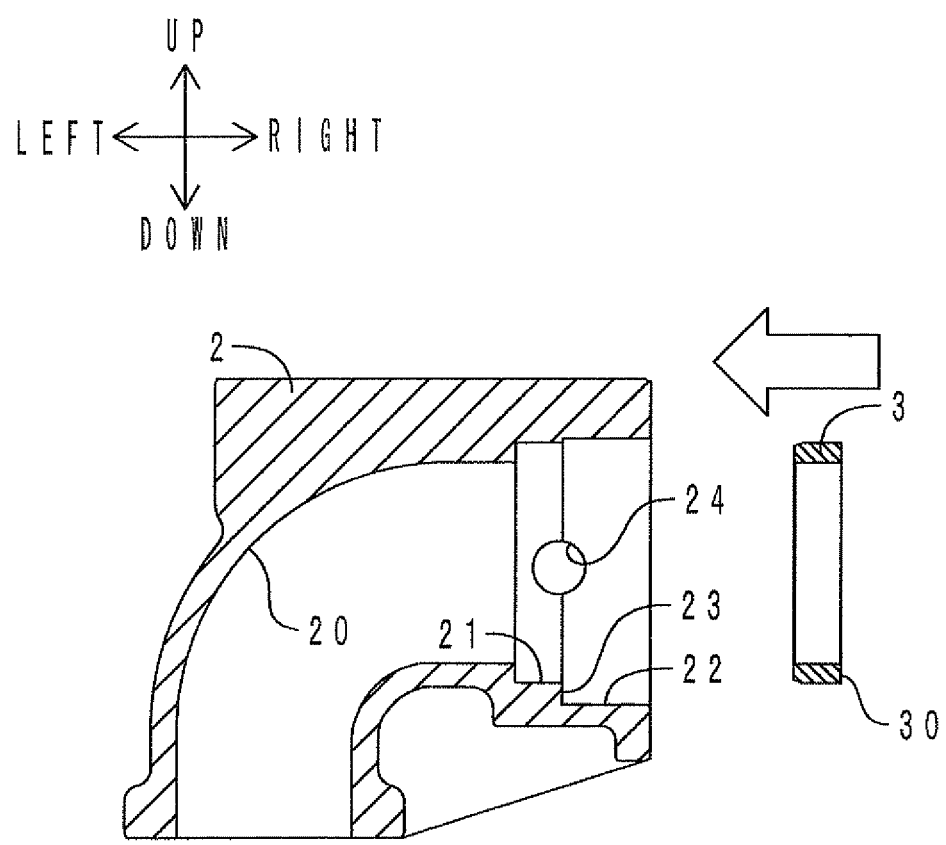
F I G. 7

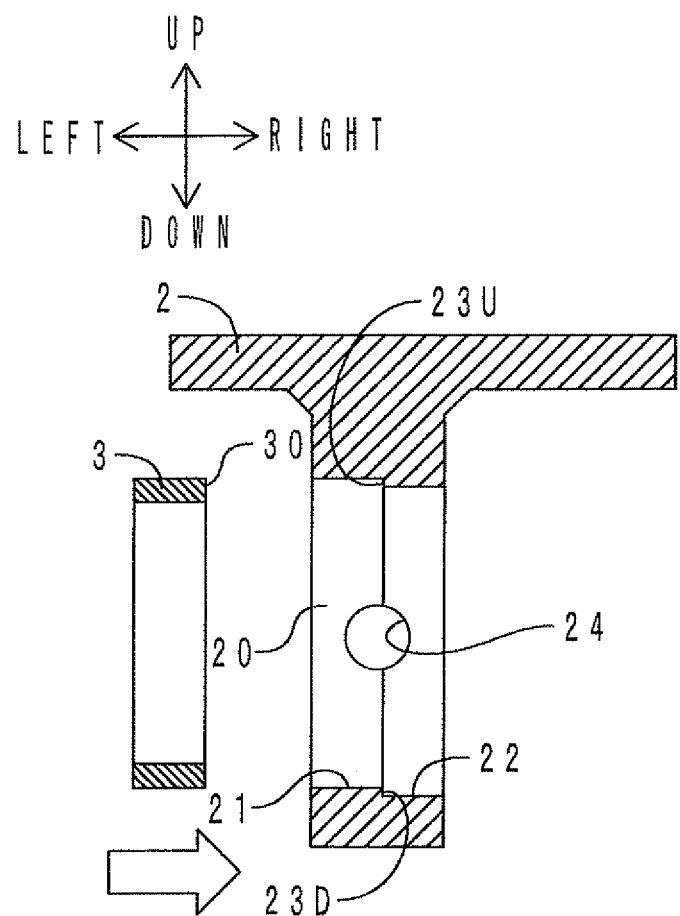
F I G. 14

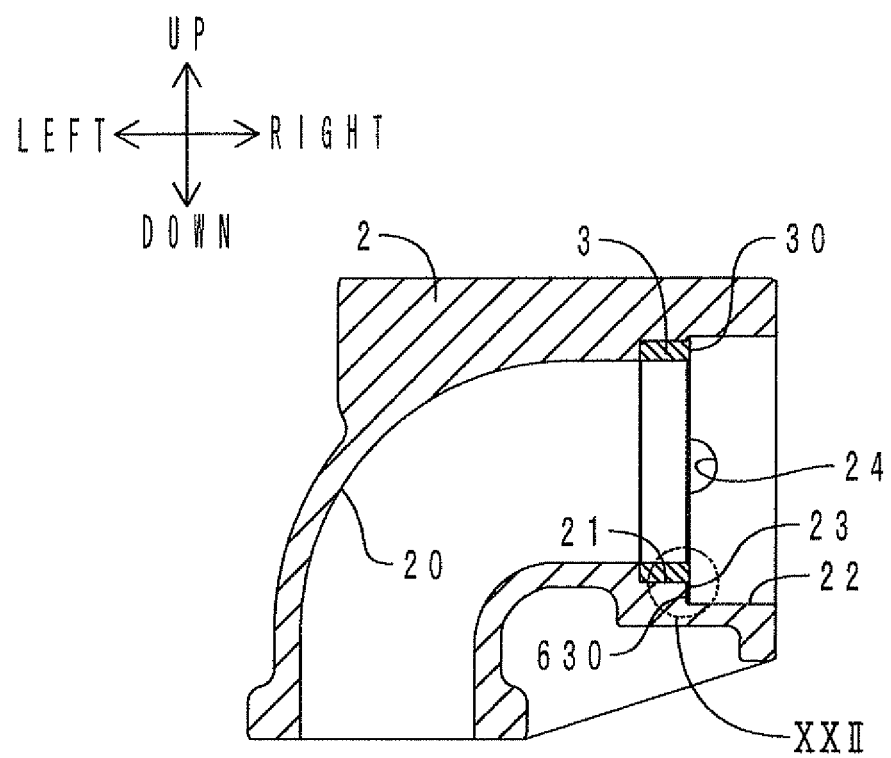
F I G. 21

FLOW CONTROL VALVE AND METHOD FOR MANUFACTURING THE SAME

TECHNICAL FIELD

The present invention relates to a flow control valve used in an exhaust gas recirculation system (hereinafter referred to as "EGR system") for a vehicle or the like and a method for manufacturing the same.

BACKGROUND ART

In a flow control valve used in an EGR system, a valve seat is formed at an interface of two cylinder members press-fitted into a gas passage (for example, see Patent Literature 1). FIG. 26 shows a sectional view of a flow control valve of the same type. As shown in FIG. 26, a flow control valve 100 includes a housing 101, a first cylinder member 102, a second cylinder member 103, and a valve body 111. These members are all formed of stainless steel. A gas passage 107 is formed inside the housing 101. The gas passage 107 includes a first cylinder member accommodating portion 109, a second cylinder member accommodating portion 110, and a radial step portion 108.

The first cylinder member 102 is accommodated in the first cylinder member accommodating portion 109. The second cylinder member 103 is accommodated in the second cylinder member accommodating portion 110. The first cylinder member 102 and the second cylinder member 103 are continuous in the axial direction in a state where inner peripheries thereof are displaced with each other in the vicinity of the radial step portion 108. A valve seat 104 is formed around the whole circumference at the interface between the first cylinder member 102 and the second cylinder member 103. The valve seat 104 includes a first area 105 and a second area 106. The first area 105 is arranged at about 180° portion of the inner periphery of the first cylinder member 102. The second area 106 is arranged at about 180° portion of the inner periphery of the second cylinder member 103. The valve body 111 detaches from and attaches to the first area 105 and the second area 106 (i.e., the valve seat 104) to open and close the gas passage 107. The flow rate of exhaust gas is adjusted by the valve body 111 turning in the gas passage 107.

CITATION LIST

Patent Literature

[Patent Literature 1] Japanese Patent Application Publication No. JP-A-2004-263723

SUMMARY OF INVENTION

Technical Problem

FIG. 27 shows an enlarged view within a circle XXVII shown in FIG. 26. As shown in FIG. 27, the radial step portion 108 is formed in the gas passage 107 of the housing 101. The radial step portion 108 causes the first cylinder member 102 and the second cylinder member 103 to fit in predetermined positions in the gas passage 107.

The first cylinder member 102 and the second cylinder member 103 contact each other in the axial direction. However, a gap C100 is formed in the axial direction between the second cylinder member 103 and the radial step portion 108.

The reason for forming the gap C100 will be described below. In the ease of attaching the first cylinder member 102 and the second cylinder member 103 to the housing 101, the first cylinder member 102 is first press-fitted into the first cylinder member accommodating portion 109. Next, the second cylinder member 103 is press-fitted into the second cylinder member accommodating portion 110. The valve seat 104 is formed by displacing the first cylinder member 102 and the second cylinder member 103 with each other in the radial direction at the interface. That is, the valve seat 104 is formed at the interface between the first cylinder member 102 and the second cylinder member 103. Therefore, in order to form the valve seat 104 reliably, it is necessary to bring the first cylinder member 102 into contact with the second cylinder member 103 in the axial direction.

However, the degree of press-fitting the second cylinder member 103 is restricted by the radial step portion 108. Therefore, for instance, in the case where an end portion (right end portion) of the first cylinder member 102 on the radial step portion side does not protrude rightward in the axial direction with respect to the radial step portion 108, the first cylinder member 102 and the second cylinder member 103 do not come into contact with each other in the axial direction. That is, the valve seat 104 is not formed.

The entire length of the first cylinder member 102 in the axial direction is set to be slightly longer than the entire length of the first cylinder member accommodating portion 109 in the axial direction. The difference in the entire lengths causes the right end portion of the first cylinder member 102 to protrude rightward in the axial direction with respect to the radial direction step portion 108. Thus, the first cylinder member 102 and the second cylinder member 103 contact reliably. That is, the valve seat 104 is reliably formed. However, on the other hand, the gap C100 is formed in the axial direction between the second cylinder member 103 and the radial step portion 108. In this manner, the gap C100 is formed inevitably in order to form the valve seat 104 reliably.

In recent years, a change of the material of the housing 101 has been considered from the viewpoint of reduction in manufacturing cost of the flow control valve. Specifically, it has been considered to use inexpensive cast iron as the material of the housing 101, instead of expensive stainless steel.

However, in the case of a diesel engine that utilizes an EGR system, a sulfuric acid-based condensate containing sulfur content of light oil is generated from the exhaust gas in the gas passage 107. Also, the exhaust gas is extremely high in temperature.

Therefore, for instance, if the housing 101 of the flow control valve 100 of the related art is formed of cast iron, there is a possibility that a high-temperature sulfuric acid-based condensate enters the gap C100 from the gas passage 107, as shown by an arrow A100 in FIG. 27. Due to the condensate, corrosion may occur in the vicinity of the radial step portion 108 of the housing 101. When the corrosion occurs in the vicinity of the radial step portion 108, an interference of the first cylinder member 102 with respect to the first cylinder member accommodating portion 109 or an interference of the second cylinder member 103 with respect to the second cylinder member accommodating portion 110 may decrease. When the interference decreases, the first cylinder member 102 or the second cylinder member 103 may fall from the housing 101. As a result, the sealability may decrease.

A flow control valve and a method for manufacturing the same of the present invention have been completed in view of the problem described above. Thus, it is an object of the present invention to provide a flow control valve in which corrosion is less likely to occur in the vicinity of a radial step portion in a gas passage of a housing and a method for manufacturing the same.

Solution to Problem (1) In order to solve the problems described above, a flow control valve of the present invention includes: a housing formed with a gas passage through which gas that generates a corrosive substance passes, the gas passage including a first cylinder member accommodating portion, a second cylinder member accommodating portion arranged adjacent to the first cylinder member accommodating portion in an axial direction, and a radial step portion located between the first cylinder member accommodating portion and the second cylinder member accommodating portion; a first cylinder member that is accommodated in the first cylinder member accommodating portion and includes a first axial end surface; a second cylinder member that is accommodated in the second cylinder member accommodating portion and includes a second axial end surface that contacts with the first axial end surface in the axial direction in a state where inner peripheries of the first axial end surface and the second axial end surface are displaced with each other in a radial direction; and a valve body that is rotatably arranged inside the first cylinder member and the second cylinder member in the radial direction and opens and closes the gas passage by detaching from and attaching to a valve seat arranged on a pair of the inner peripheries, and in the flow control valve, the housing is formed of cast iron, at least surfaces of the first cylinder member and the second cylinder member are formed of a highly corrosion resistant material having higher corrosion resistance against the corrosive substance than corrosion resistance of cast iron, at least one of the first axial end surface and the second axial end surface includes an opposing portion that opposes the radial step portion in the axial direction, and a gas seal structure that suppresses entry of the corrosive substance between the opposing portion and the radial step portion is arranged between the opposing portion and the radial step portion (corresponding to claim 1).

According to the flow control valve of the present invention, at least one of the first axial end surface and the second axial end surface includes the opposing portion that opposes the radial step portion in the axial direction. The gas seal structure is arranged between the opposing portion and the radial step portion. Therefore, the corrosive substance does not easily enter between the opposing portion and the radial step portion. Thus, the vicinity of the radial step portion of the housing formed of cast iron is less likely to be exposed to the corrosive substance. In this manner, with the flow control valve of the present invention, corrosion is less likely to occur in the vicinity of the radial step portion of the housing. Therefore, the interference of the first cylinder member with respect to the first cylinder member accommodating portion or the interference of the second cylinder member with respect to the second cylinder member accommodating portion is less likely to decrease. Thus, the first cylinder member or the second cylinder member is less likely to fall from the housing. As a result, the sealability is less likely to decrease.

(2) Preferably, in the configuration of (1) described above, the gas seal structure is a surface contact structure that eliminates a gap between the opposing portion and the radial step portion almost entirely (corresponding to claim 2).

In this configuration, the gap between the opposing portion and the radial step portion can be eliminated almost entirely. Therefore, the corrosive substance does not easily enter between the opposing portion and the radial step portion. Thus, the vicinity of the radial step portion of the housing formed of cast iron is less likely to be exposed to the corrosive substance.

(3) Preferably, in the configuration of (1) or (2) described above, the gas seal structure is a filling structure in which a gap between the opposing portion and the radial step portion is filled with a filler (corresponding to claim 3).

In this configuration, the gap between the opposing portion and the radial step portion can be filled with the filler. Therefore, the corrosive substance does not easily enter between the opposing portion and the radial step portion. Thus, the vicinity of the radial step portion of the housing formed of cast iron is less likely to be exposed to the corrosive substance.

(4) Also, in order to solve the problems described above, a method for manufacturing a flow control valve of the present invention includes: a gas passage forming step of forming in a housing formed of cast iron a gas passage through which gas that generates a corrosive substance passes, the gas passage including a first cylinder member accommodating portion, a second cylinder member accommodating portion arranged adjacent to the first cylinder member accommodating portion in an axial direction, and a radial step portion located between the first cylinder member accommodating portion and the second cylinder member accommodating portion; a first cutting step of cutting at least the first cylinder member accommodating portion; a first cylinder member press-fitting step of press-fitting in the axial direction a first cylinder member, which includes a first axial end surface and a surface formed of a highly corrosion resistant material having higher corrosion resistance against the corrosive substance than corrosion resistance of cast iron, into the cut first cylinder member accommodating portion; a second cutting step of cutting the first axial end surface and the radial step portion so as to be approximately flush with each other by simultaneously cutting at least the first axial end surface and the radial step portion among the first axial end surface, the radial step portion, and the second cylinder member accommodating portion; and a second cylinder member press-fitting step of press-fitting in the axial direction a second cylinder member, which includes a surface formed of the highly corrosion resistant material and a second axial end surface, into the cut second cylinder member accommodating portion such that the second axial end surface comes into contact with the first axial end surface and the radial step portion (corresponding to claim 4). Herein, the term "cutting" refers to cutting and adjustment of an object surface into a desired shape.

According to the method for manufacturing a flow control valve of the present invention, the first axial end surface and the radial step portion are simultaneously cut in the second cutting step. Therefore, the first axial end surface and the radial step portion are cut so as to be approximately flush with each other. Thus, in the second cylinder member press-fitting step, the second axial end surface of the second cylinder member can be brought into contact with the first axial end surface and the radial step portion that are approximately flush with each other. That is, the gap between the second axial end surface and the first axial end surface as well as the radial step portion can be eliminated almost entirely. Therefore, the corrosive substance does not easily enter between the second axial end surface and the first axial end surface as well as the radial step portion. Thus, the vicinity of the radial step portion of the housing formed of cast iron is less likely to be exposed to the corrosive substance.

According to the method for manufacturing a flow control valve of the present invention, the flow control valve in which corrosion is less likely to occur in the vicinity of the radial step portion of the housing can be manufactured by a simple work in which the first axial end surface and the radial step portion are simultaneously cut.

(5) Preferably, the configuration of (4) described above includes a filler arranging step of arranging a filler at least in the radial step portion between the second cutting step and the second cylinder member press-fitting step (corresponding to claim 5).

In this configuration, the filler can be arranged in the gap after the gap between the second axial end surface and the radial step portion can be eliminated almost entirely. Therefore, the corrosive substance does not easily enter between the second axial end surface and the radial step portion. Thus, the vicinity of the radial step portion of the housing formed of cast iron is less likely to be exposed to the corrosive substance.

(6) Also, in order to solve the problems described above, a method for manufacturing a flow control valve of the present invention includes: a gas passage forming step of forming in a housing formed of cast iron a gas passage through which gas that generates a corrosive substance passes, the gas passage including a first cylinder member accommodating portion, a second cylinder member accommodating portion arranged adjacent to the first cylinder member accommodating portion in an axial direction, and a radial step portion located between the first cylinder member accommodating portion and the second cylinder member accommodating portion; an all-surface cutting step of cutting the first cylinder member accommodating portion, the second cylinder member accommodating portion, and the radial step portion; a first cylinder member press-fitting step of press-fitting in the axial direction a first cylinder member, which includes a first axial end surface and a surface formed of a highly corrosion resistant material having higher corrosion resistance against the corrosive substance than corrosion resistance of cast iron, into the cut first cylinder member accommodating portion; a filler arranging step of arranging a filler at least in the radial step portion; and a second cylinder member press-fitting step of press-fitting in the axial direction a second cylinder member, which includes a surface formed of the highly corrosion resistant material and a second axial end surface, into the cut second cylinder member accommodating portion such that the second axial end surface comes into contact with the first axial end surface and the filler (corresponding to claim 6). Herein, the term "cutting" refers to cutting and adjustment of an object surface into a desired shape.

According to the method for manufacturing the flow control valve of the present invention, the filler can be filled between the second axial end surface and the radial step portion by bringing the second cylinder member into contact with the first cylinder member in the second cylinder member press-fitting step. That is, the gap between the second axial end surface and the radial step portion can be filled. Therefore, the corrosive substance does not easily enter between the second axial end surface and the radial step portion. Thus, the vicinity of the radial step portion of the housing formed of cast iron is less likely to be exposed to the corrosive substance.

According to the method for manufacturing a flow control valve of the present invention, the radial step portion and the first axial end surface do not need to be cut so as to be approximately flush with each other. Therefore, the cutting is easily performed. Also, it is not necessary to perform complex cutting in a plurality of steps.

ADVANTAGEOUS EFFECTS OF INVENTION

According to the present invention, a flow control valve in which corrosion is less likely to occur in the vicinity of a radial step portion in a gas passage of a housing and a method for manufacturing the same can be provided.

BRIEF DESCRIPTION OF DRAWINGS

FIG. 5 is a schematic view showing a gas passage forming step of a method for manufacturing the flow control valve of the first embodiment;

FIG. 6 is a schematic view showing a first cutting step of the manufacturing method;

FIG. 7 is a schematic view showing a first cylinder member press-fitting step of the manufacturing method;

FIG. 14 is a schematic view showing a first cylinder member press-fitting step of the manufacturing method;

FIG. 21 is a schematic view showing a filler arranging step of a method for manufacturing the flow control valve of the third embodiment;

DESCRIPTION OF EMBODIMENTS

Hereinafter, embodiments in which a flow control valve and a method for manufacturing the same of the present invention are embodied as a flow control valve used in an EGR system and a method for manufacturing the same will be described.

<First Embodiment>

(Arrangement of Flow Control Valve)

First, the arrangement of a valve assembly of this embodiment will be described briefly. In a vehicle (diesel engine vehicle) (not shown), an EGR pipe that connects an exhaust manifold and an intake manifold is provided. The valve assembly is mounted to the EGR pipe. By opening or closing the valve assembly, the flow rate of exhaust gas flowing in the EGR pipe can be controlled.

(Configuration of Flow Control Valve)

Figure 1:
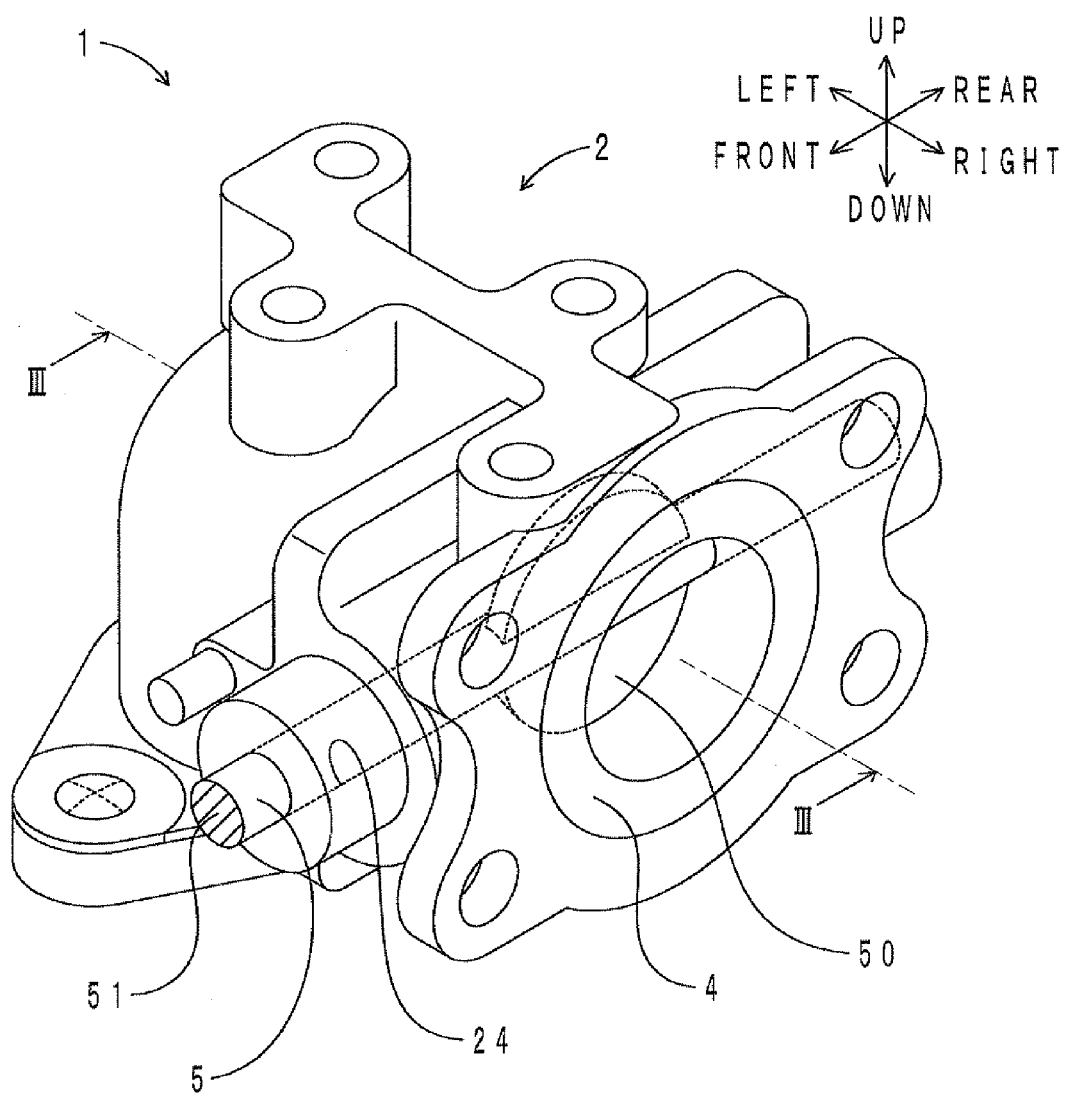
FIG. 1 is a perspective view of a flow control valve of a first embodiment.
Figure 2:
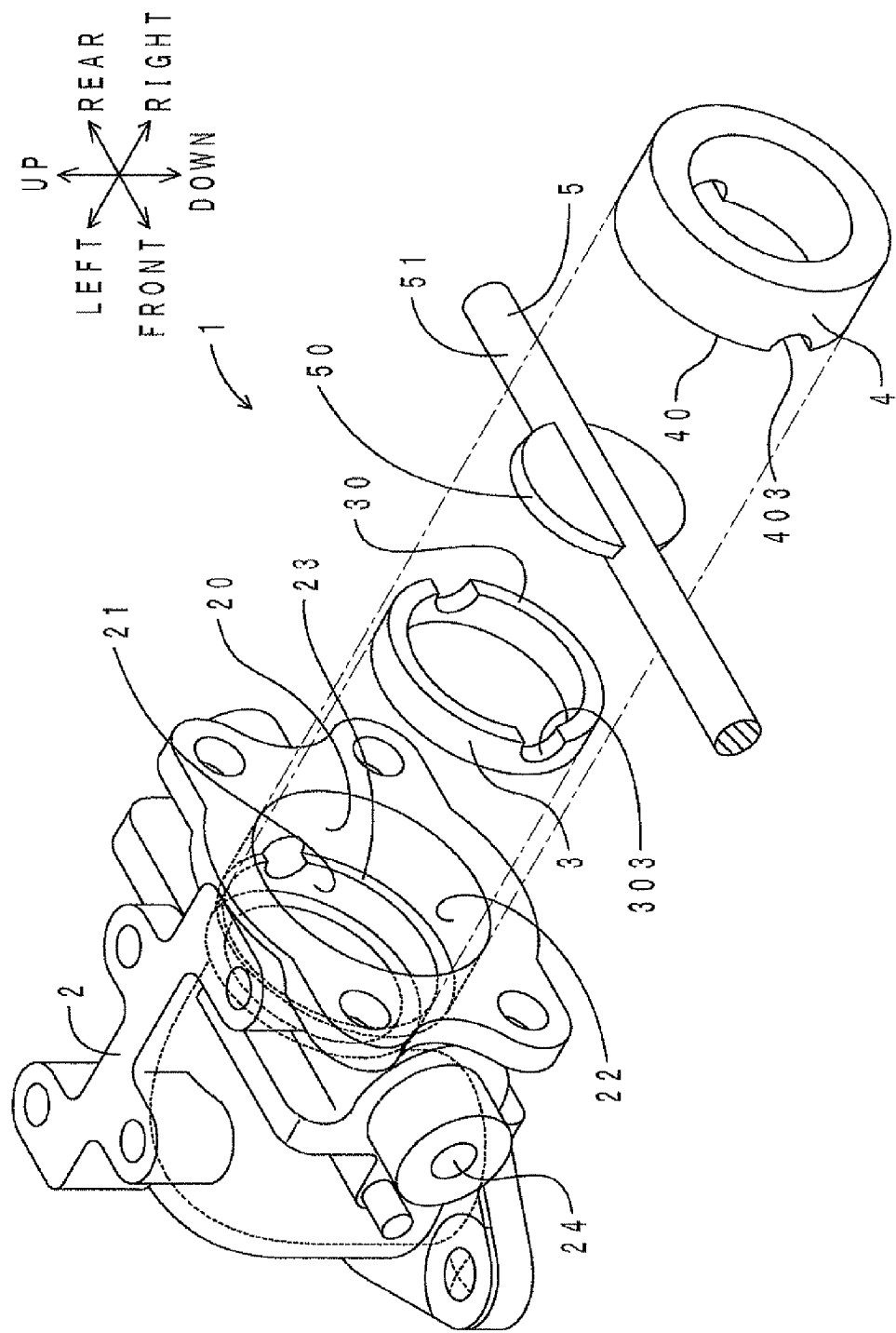
FIG. 2 is an exploded perspective view of the flow control valve.
Figure 3:
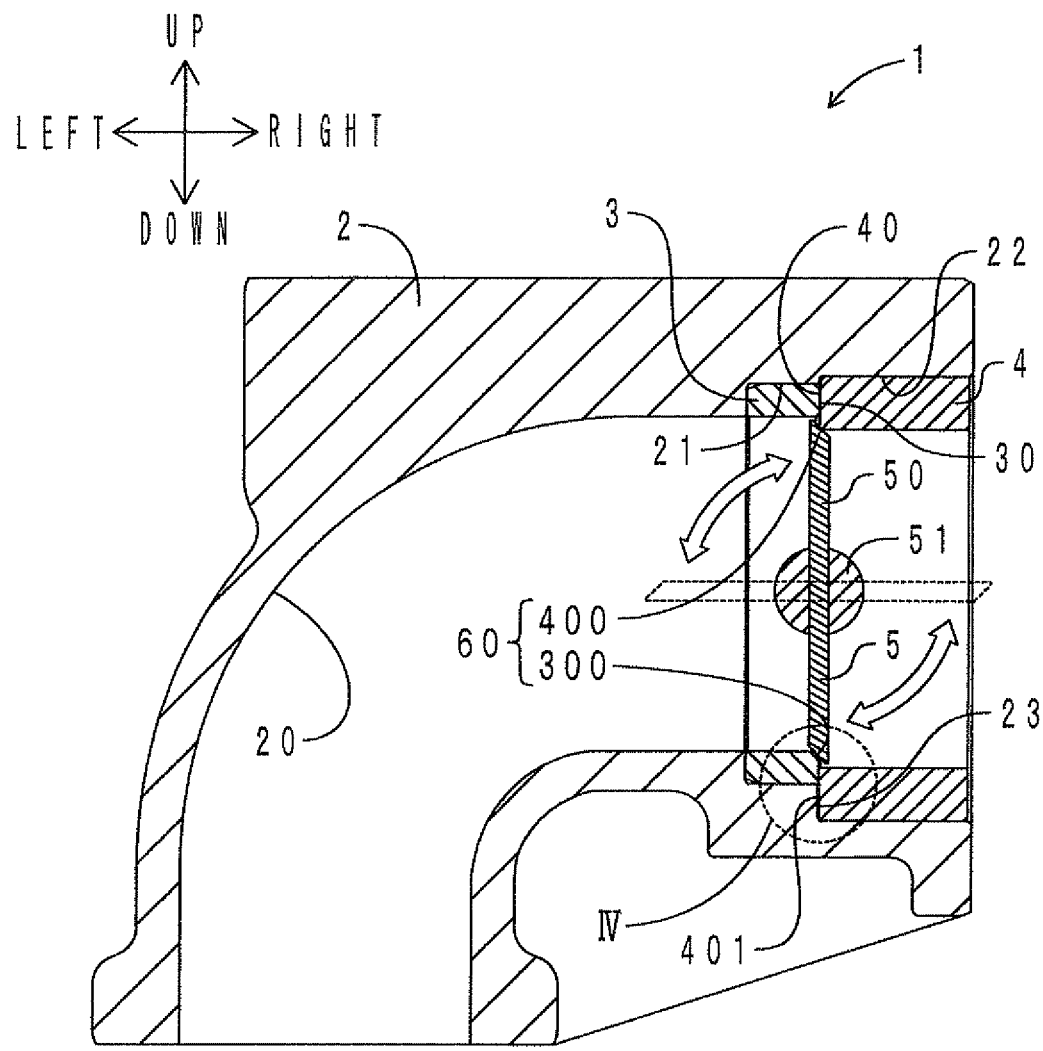
FIG. 3 is a sectional view along a direction shown in FIG. 1.
Figure 4:
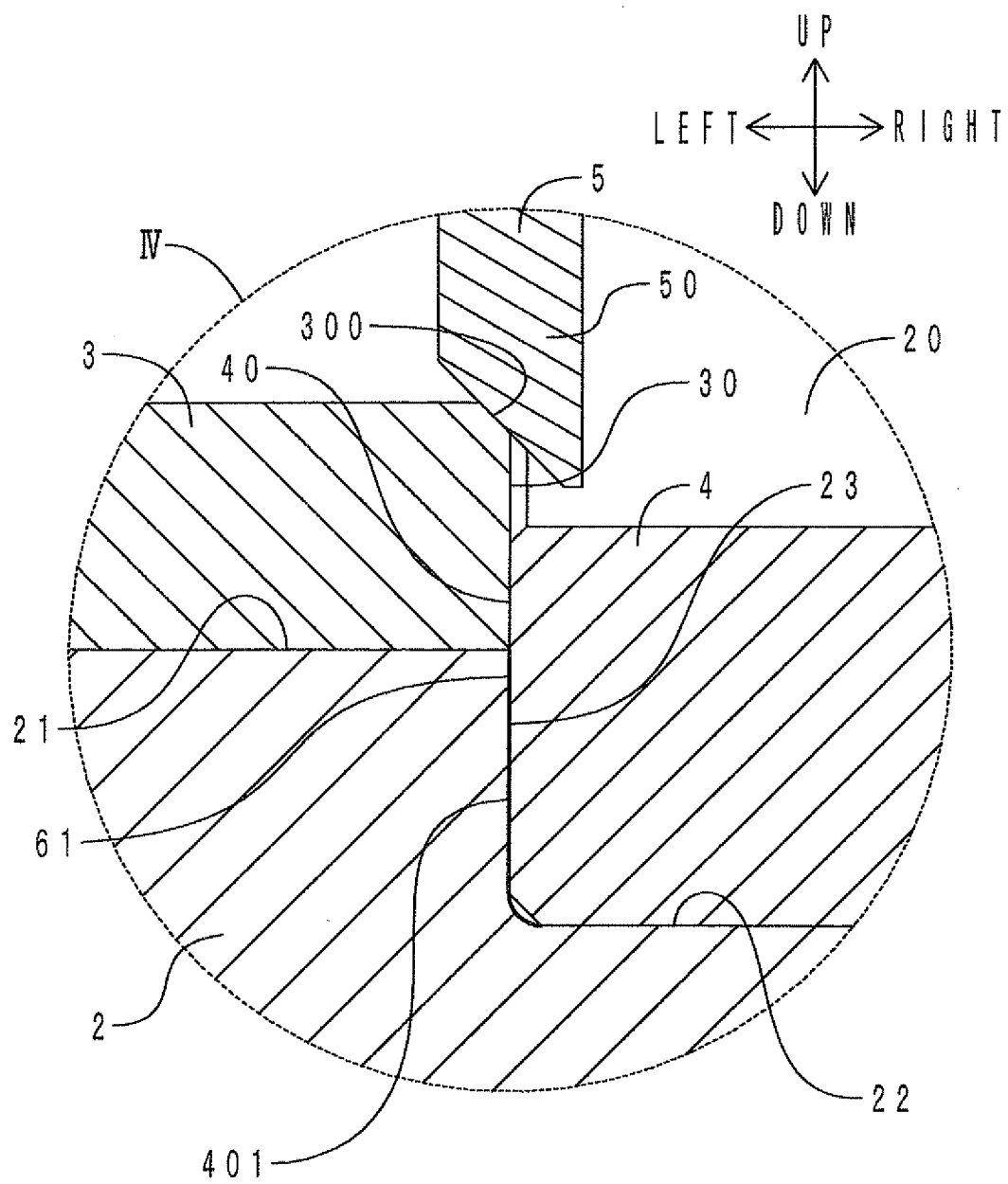
FIG. 4 is an enlarged view within a circle IV shown in FIG. 3.

Next, the configuration of the flow control valve of this embodiment will be described. FIG. 1 shows a perspective view of the flow control valve of this embodiment. FIG. 2 shows an exploded perspective view of the same flow control valve. FIG. 3 shows a sectional view along a direction shown in FIG. 1. FIG. 4 shows an enlarged view within a circle IV shown in FIG. 3. As shown in FIGS. 1 to 4, a flow control valve 1 of this embodiment includes a housing 2, a first cylinder member 3, a second cylinder member 4, a valve body 5, and a surface contact structure 61.

The housing 2 is formed of ductile cast iron (FCD). In the housing 2, a gas passage 20 and a shaft insertion hole 24 are formed. The gas passage 20 penetrates the housing 2 in an L-shape connecting a lower surface and a right surface. In the vicinity of a right side opening of the gas passage 20, a first cylinder member accommodating portion 21, a second cylinder member accommodating portion 22, and a radial step portion 23 are formed.

The second cylinder member accommodating portion 22 has a circle hole shape. The second cylinder member accommodating portion 22 extends leftward from the right side opening of the gas passage 20. The first cylinder member accommodating portion 21 has a circle hole shape. The first cylinder member accommodating portion 21 extends leftward from a left end of the second cylinder member accommodating portion 22. The first cylinder member accommodating portion 21 has a smaller diameter than the second cylinder member accommodating portion 22. The first cylinder member accommodating portion 21 and the second cylinder member accommodating portion 22 are displaced with each other in the radial direction (up-down direction). Specifically, an axial line of the first cylinder member accommodating portion 21 is displaced upward with respect to an axial line of the second cylinder member accommodating portion 22.

The radial step portion 23 is located between a right end of the first cylinder member accommodating portion 21 and the left end of the second cylinder member accommodating portion 22. The radial step portion 23 has an approximately planar shape extending in the radial direction. The shaft insertion hole 24 penetrates the gas passage 20 in the diameter direction (front-rear direction). The shaft insertion hole 24 is arranged in the radial step portion 23.

The first cylinder member 3 is formed of stainless steel and has a short axis cylinder shape. The first cylinder member 3 is accommodated in the first cylinder member accommodating portion 21. At a right end of the first cylinder member 3, an approximately planar-shaped first axial end surface 30 is arranged. In the first axial end surface 30, a pair of cutout portions 303 is formed. The pair of cutout portions 303 is arranged to be apart in the front-rear direction. The cutout portion 303 has an approximately C-shape that is open rightward. The first axial end surface 30 is approximately flush with the radial step portion 23.

The second cylinder member 4 is formed of stainless steel and has a short axis cylinder shape. The second cylinder member 4 is accommodated in the second cylinder member accommodating portion 22. At a left end of the second cylinder member 4, an approximately planar-shaped second axial end surface 40 is arranged. In the second axial end surface 40, a pair of cutout portions 403 is formed. The pair of cutout portions 403 is arranged to be apart in the front-rear direction. The cutout portion 403 has an approximately C-shape that is open leftward.

The pair of cutout portions 403 of the second cylinder member 4 is continuous with the pair of cutout portions 303 of the first cylinder member 3 in the axial direction (left-right direction). That is, the pair of cutout portions 303 and the pair of cutout portions 403 form a pair of joined holes. The pair of joined holes is continuous with the shaft insertion hole 24 in the front-rear direction.

The second axial end surface 40 of the second cylinder member 4 makes surface contact with the first axial end surface 30 of the first cylinder member 3 in the left-right direction. As described above, the first cylinder member accommodating portion 21 and the second cylinder member accommodating portion 22 are displaced with each other in the up-down direction. Therefore, an inner periphery of the first axial end surface 30 and an inner periphery of the second axial end surface 40 are displaced with each other in the up-down direction. At the inner periphery of the first axial end surface 30, a first area 300 of a valve seat 60 is arranged. The first area 300 is arranged at about 180° portion which is the lower half of the inner periphery. In contrast, at the inner periphery of the second axial end surface 40, a second area 400 of the valve seat 60 is arranged. The second area 400 is arranged at about 180° portion which is the upper half of the inner periphery. That is, the first area 300 and the second area 400 form the valve seat 60.

The second axial end surface 40 includes an opposing portion 401. The opposing portion 401 makes surface contact with the radial step portion 23 in the left-right direction. That is, the second axial end surface 40 makes surface contact with the radial step portion 23 and the first axial end surface 30 in the left-right direction. In this manner, in the flow control valve 1 of this embodiment, the surface contact structure 61 is ensured by the surface contact of the opposing portion 401 and the radial step portion 23.

The valve body 5 includes a valve main body 50 and a shaft 51. The shaft 51 is formed of stainless steel and has a round bar shape. The shaft 51 is inserted to the shaft insertion hole 24 and the pair of joined holes (formed by the pair of cutout portions 303 and the pair of cutout portions 403). The shaft 51 crosses the gas passage 20 in the front-rear direction.

The valve main body 50 is formed of stainless steel and has a disk shape. The valve main body 50 is fixed to the shaft 51. As shown in FIG. 3, the valve main body 50 is arranged in the gas passage 20. The valve main body 50 is capable of turning about the axis of the shaft 51. The gas passage 20 can be opened or closed by a detachment or attachment of an outer periphery of the valve main body 50 with respect to the valve seat 60 (the first area 300 and the second area 400). By changing the turning angle of the valve main body 50, the sectional area of the gas passage 20 (i.e., the flow rate of exhaust gas) can be adjusted.

(Method for Manufacturing Flow Control Valve)

Next, a method for manufacturing the flow control valve 1 of this embodiment will be described. The method for manufacturing the flow control valve 1 of this embodiment includes a gas passage forming step, a first cutting step, a first cylinder member press-fitting step, a second cutting step, and a second cylinder member press-fitting step.

Figure 8:
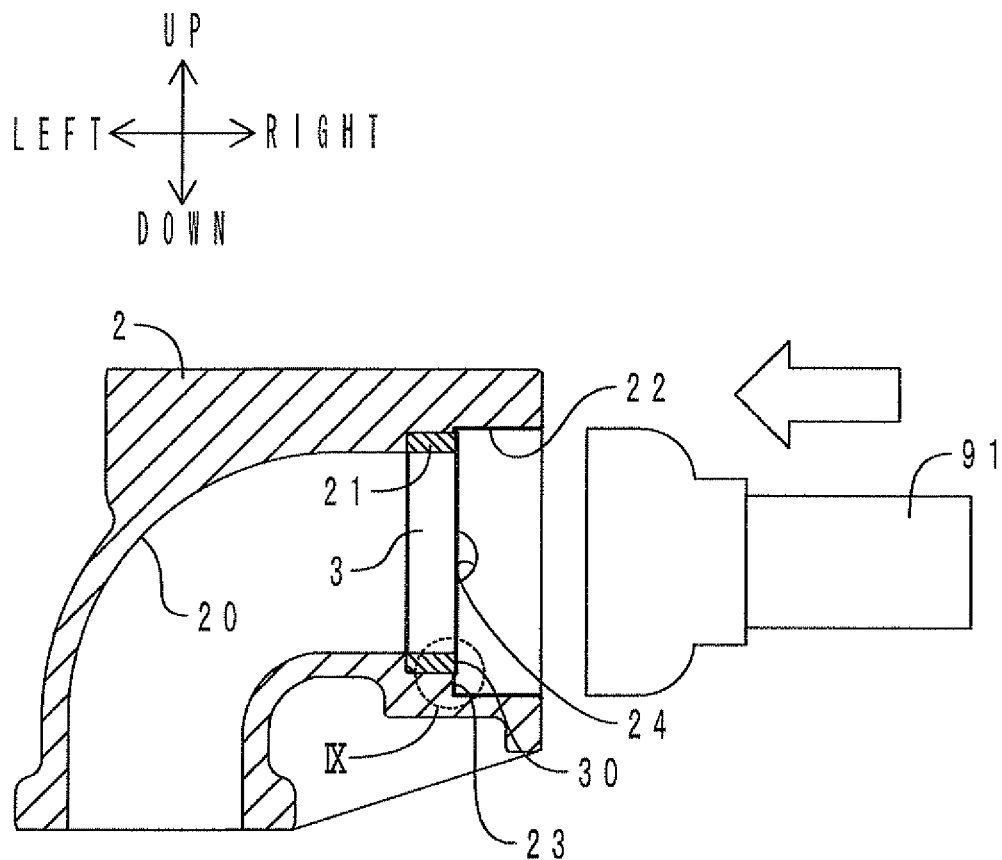
FIG. 8 is a schematic view showing a second cutting step of the manufacturing method.
Figure 9:
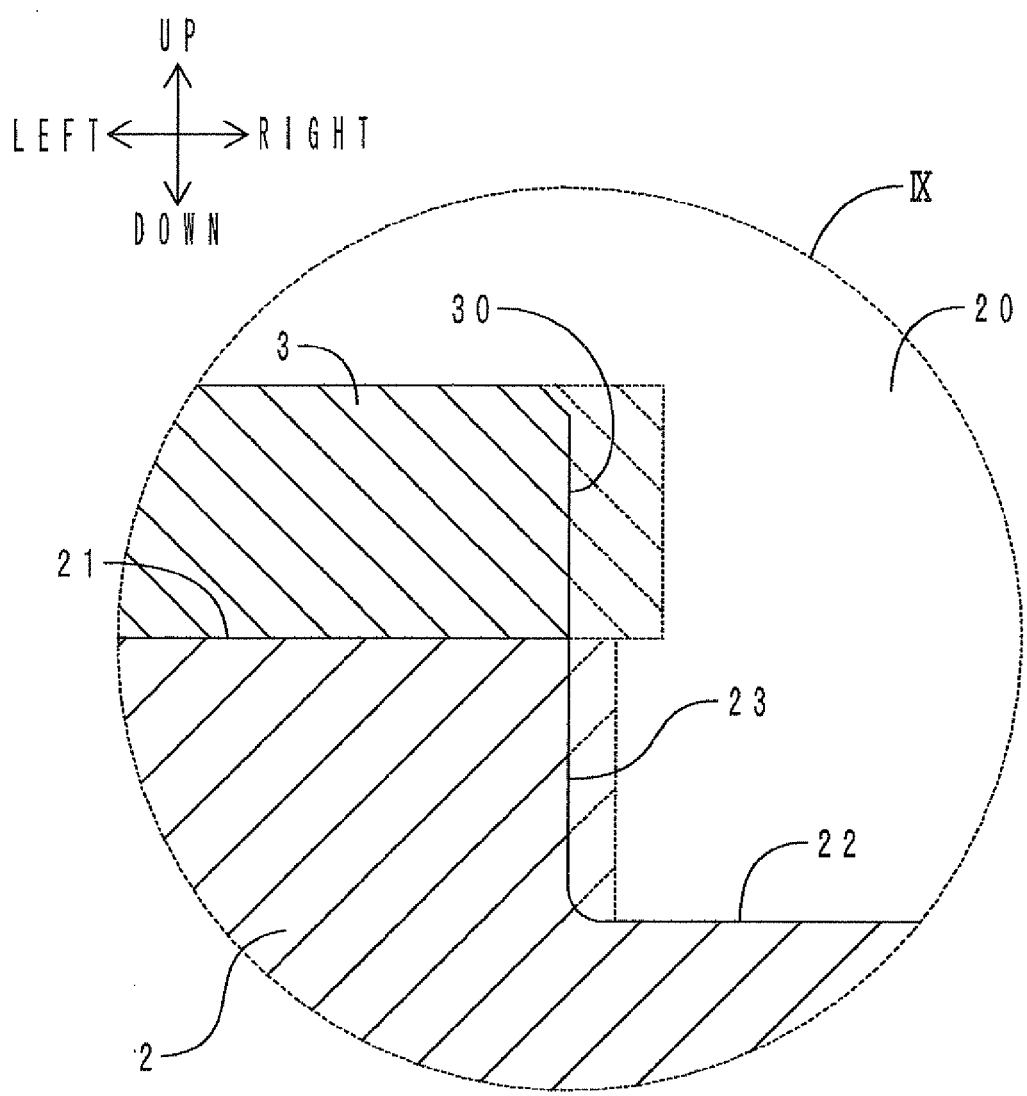
FIG. 9 is an enlarged view within a circle IX shown in FIG. 8.
Figure 10:
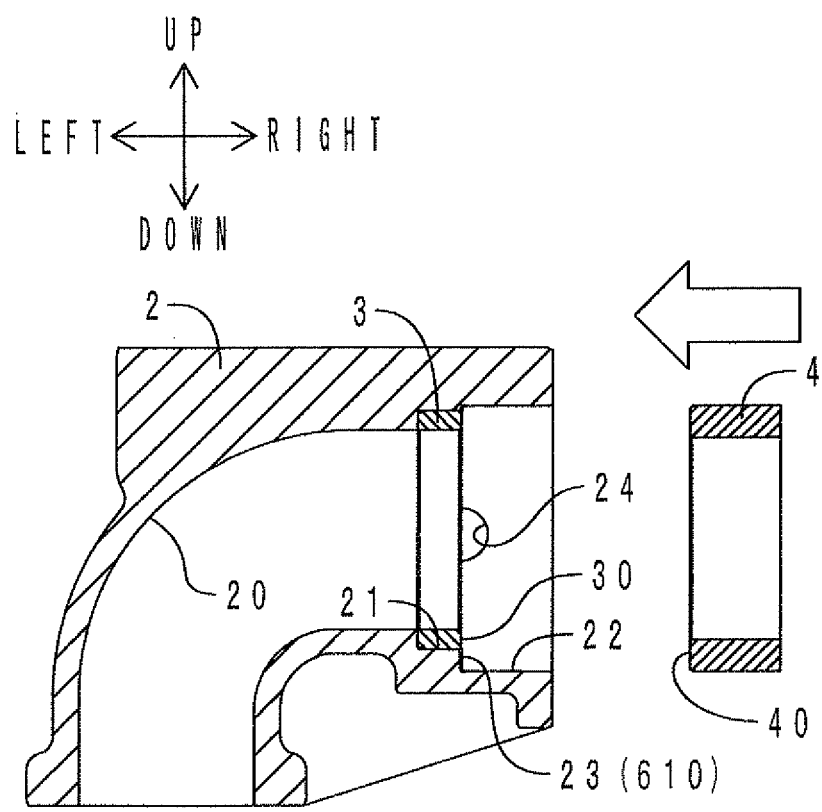
FIG. 10 is a schematic view showing a second cylinder member press-fitting step of the manufacturing method.

FIG. 5 shows a schematic view showing the gas passage forming step of the method for manufacturing a flow control valve of this embodiment. FIG. 6 shows a schematic view showing the first cutting step of the manufacturing method. FIG. 7 shows a schematic view showing the first cylinder member press-fitting step of the manufacturing method. FIG. 8 shows a schematic view showing the second cutting step of the manufacturing method. FIG. 9 shows an enlarged view within a circle IX shown in FIG. 8. FIG. 10 shows a schematic view showing the second cylinder member press-fitting step of the manufacturing method.

In the gas passage forming step, as shown in FIG. 5, the housing 2 is prepared by casting. At the time of casting, the gas passage 20 and the shaft insertion hole 24 are formed in the housing 2.

In the first cutting step, as shown by bold lines in FIG. 6, attachment surfaces (upper surface, lower surface, and right surface) of the housing 2 to which adjacent members are attached are cut. In addition, an inner peripheral surface of the gas passage 20 is cut. Specifically, a milling cutter 90 is inserted into the gas passage 20 from a right end opening of the second cylinder member accommodating portion 22. With the milling cutter 90, the inner peripheral surface of the first cylinder member accommodating portion 21 is cut. Note that, when moving the milling cutter 90, an inner peripheral surface of the second cylinder member accommodating portion 22 and a surface of the radial step portion 23 are cut. In the first cylinder member press-fitting step, as shown in FIG. 7, the first cylinder member 3 is press-fitted into the first cylinder member accommodating portion 21 from the right end opening of the second cylinder member accommodating portion 22.

In the second cutting step, as shown in FIG. 8, a milling cutter 91 is inserted into the second cylinder member accommodating portion 22 from the right end opening of the second cylinder member accommodating portion 22. As shown by bold lines in FIG. 8, the inner peripheral surface of the second cylinder member accommodating portion 22 is cut with the milling cutter 91. As shown in FIG. 9, the first axial end surface 30 of the first cylinder member 3 and the surface of the radial step portion 23 are simultaneously cut with the milling cutter 91. As shown by dotted lines in FIG. 9, the first axial end surface 30 and the radial step portion 23 are not flush with each other before the second cutting step. In contrast, as shown by a solid line in FIG. 9, the first axial end surface 30 and the radial step portion 23 are cut so as to be approximately flush with each other after the second cutting step.

In the second cylinder member press-fitting step, as shown in FIG. 10, the second cylinder member 4 is press-fitted into the second cylinder member accommodating portion 22 from the right end opening of the second cylinder member accommodating portion 22. As described above, the radial step portion 23 and the first axial end surface 30 are cut so as to be approximately flush with each other. Therefore, as shown in FIG. 4, the second axial end surface 40 of the second cylinder member 4 makes surface contact with the radial step portion 23 and the first axial end surface 30.

Then, as shown in FIG. 2, the cutout portions 303 and the cutout portions 403 are formed in the first cylinder member 3 and the second cylinder member 4, respectively. Then, the shaft 51 is inserted to the shaft insertion hole 24. The valve main body 50 is mounted to the shaft 51 from the right end opening of the second cylinder member accommodating portion 22. In this manner, the valve body 5 is attached to the housing 2. The flow control valve 1 of this embodiment is manufactured by performing the steps described above.

[Advantageous Effects]

Next, advantageous effects of the flow control valve 1 and the method for manufacturing the same of this embodiment will be described. In the case of a diesel engine, a sulfuric acid-based condensate containing sulfur content in light oil is generated from the exhaust gas in the gas passage 20. Note that a corrosive substance of the present invention includes the condensate.

In the flow control valve 1 of this embodiment, the second axial end surface 40 includes the opposing portion 401 that opposes the radial step portion 23 in the axial direction, as shown in FIG. 4. The surface contact structure 61 is arranged between the opposing portion 401 and the radial step portion 23. Therefore, a gap between the opposing portion 401 and the radial step portion 23 can be eliminated almost entirely.

In the flow control valve 1 of this embodiment, the condensate generated from the exhaust gas does not easily enter between the opposing portion 401 and the radial step portion 23. Thus, the vicinity of the radial step portion 23 of the housing 2 is less likely to be exposed to the condensate. In this manner, in the flow control valve 1 of this embodiment, corrosion is less likely to occur in the vicinity of the radial step portion 23 of the housing 2. Therefore, the interference of the first cylinder member 3 with respect to the first cylinder member accommodating portion 21 or the interference of the second cylinder member 4 with respect to the second cylinder member accommodating portion 22 is less likely to decrease. Thus, the first cylinder member 3 or the second cylinder member 4 is less likely to fall from the housing 2. Thus, the sealability is less likely to decrease.

With the method for manufacturing the flow control valve 1 of this embodiment, the first axial end surface 30 and the radial step portion 23 can be cut so as to be approximately flush with each other by simultaneously cutting the first axial end surface 30 and the radial step portion 23 in the second cutting step, as shown in FIG. 9. Therefore, in the second cylinder member press-fitting step, the second axial end surface 40 of the second cylinder member 4 can be brought into contact the radial step portion 23 and the first axial end surface 30. That is, a gap between the second axial end surface 40 and the radial step portion 23 as well as the first axial end surface 30 can be eliminated almost entirely. In this manner, with the method for manufacturing the flow control valve 1 of this embodiment, the flow control valve 1 in which corrosion is less likely to occur in the vicinity of the radial step portion 23 can be manufactured easily.

<Second Embodiment>

The difference of a flow control valve of this embodiment from the flow control valve of the first embodiment is that the gas passage extends in a linear shape. The difference of a method for manufacturing a flow control valve of this embodiment from the method for manufacturing a flow control valve of the first embodiment is that a press-fitting direction of the first cylinder member in the first cylinder member press-fitting step and a press-fitting direction of the second cylinder member in the second cylinder member press-fitting step are opposite. Thus, herein, only the differences will be mainly described.

(Configuration of Flow Control Valve)

Figure 11:
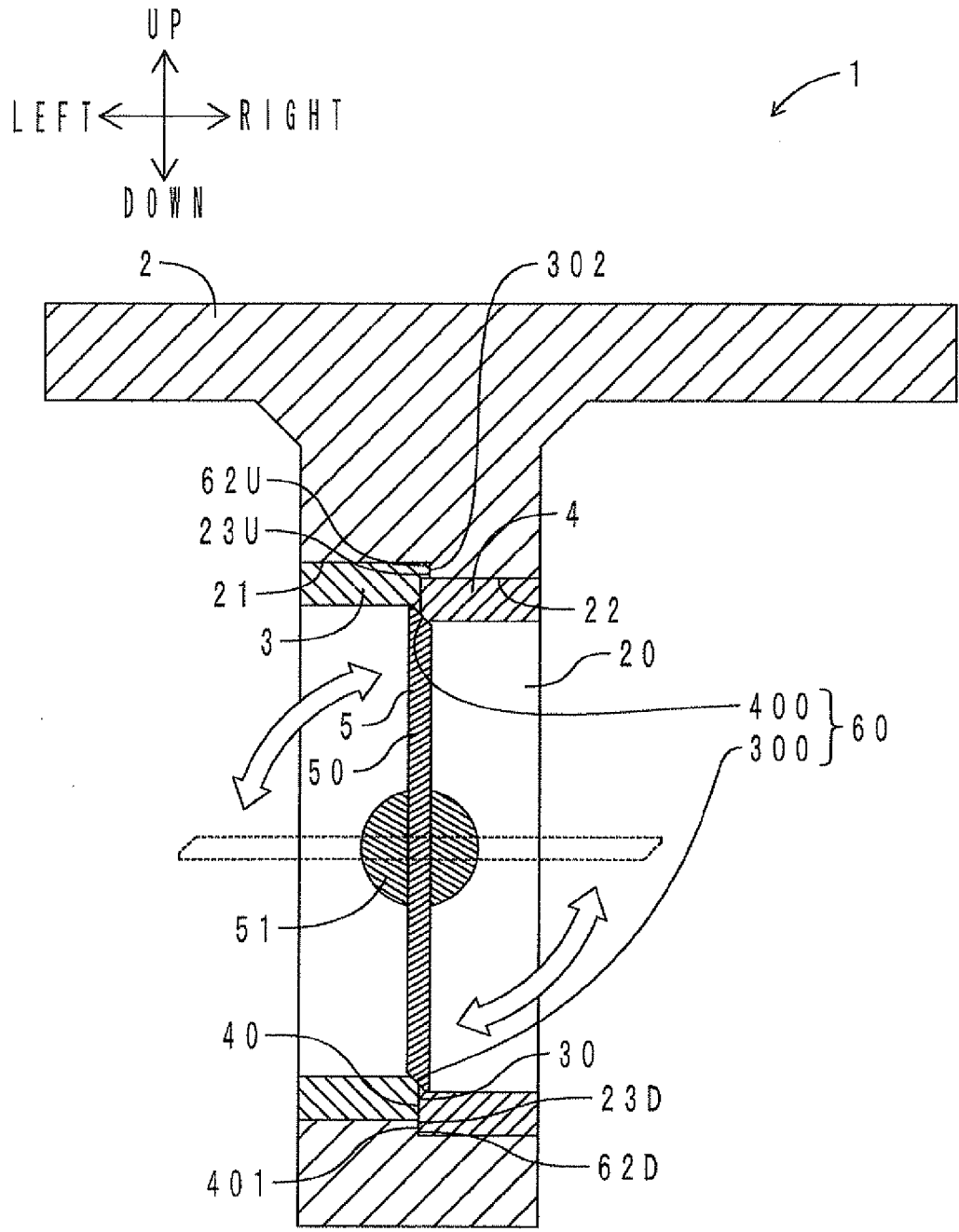
FIG. 11 is an axial sectional view of a flow control valve of a second embodiment.

First, the configuration of the flow control valve of this embodiment will be described. FIG. 11 shows an axial sectional view of the flow control valve of this embodiment. Note that portions corresponding to those in FIG. 3 are shown by the same reference signs.

As shown in FIG. 11, the gas passage 20 has a linear shape extending in the left-right direction. The first cylinder member accommodating portion 21 and the second cylinder member accommodating portion 22 have approximately the same diameters. The first cylinder member accommodating portion 21 and the second cylinder member accommodating portion 22 are displaced with each other in the radial direction (up-down direction). Specifically, the axial line of the first cylinder member accommodating portion 21 is displaced upward with respect to the axial line of the second cylinder member accommodating portion 22.

Radial step portions 23U and 23D are located between the right end of the first cylinder member accommodating portion 21 and the left end of the second cylinder member accommodating portion 22. The radial step portion 23U extends over approximately 180° in the upper half. The radial step portion 23U faces leftward. On the other hand, the radial step portion 23D extends over approximately 180° in the lower half. The radial step portion 23D faces rightward.

The first cylinder member 3 is accommodated in the first cylinder member accommodating portion 21. At the right end of the first cylinder member 3, the first axial end surface 30 is arranged. In the first axial end surface 30, an opposing portion 302 is arranged at about 180° portion which is the upper half. The opposing portion 302 makes surface contact with the radial step portion 23U. That is, a surface contact structure 62U is ensured between the opposing portion 302 and the radial step portion 23U by the surface contact between the opposing portion 302 and the radial step portion 23U.

The second cylinder member 4 is accommodated in the second cylinder member accommodating portion 22. At the left end of the second cylinder member 4, the second axial end surface 40 is arranged. In the second axial end surface 40, the opposing portion 401 is arranged at about 180° portion which is the lower half. The opposing portion 401 makes surface contact with the radial step portion 23D. That is, a surface contact structure 62D is ensured between the opposing portion 401 and the radial step portion 23D by the surface contact of the opposing portion 401 and the radial step portion 23D.

(Method for Manufacturing Flow Control Valve)

Next, the method for manufacturing the flow control valve 1 of this embodiment will be described. The method for manufacturing the flow control valve 1 of this embodiment includes the gas passage forming step, the first cutting step, the first cylinder member press-fitting step, the second cutting step, and the second cylinder member press-fitting step.

Figure 12:
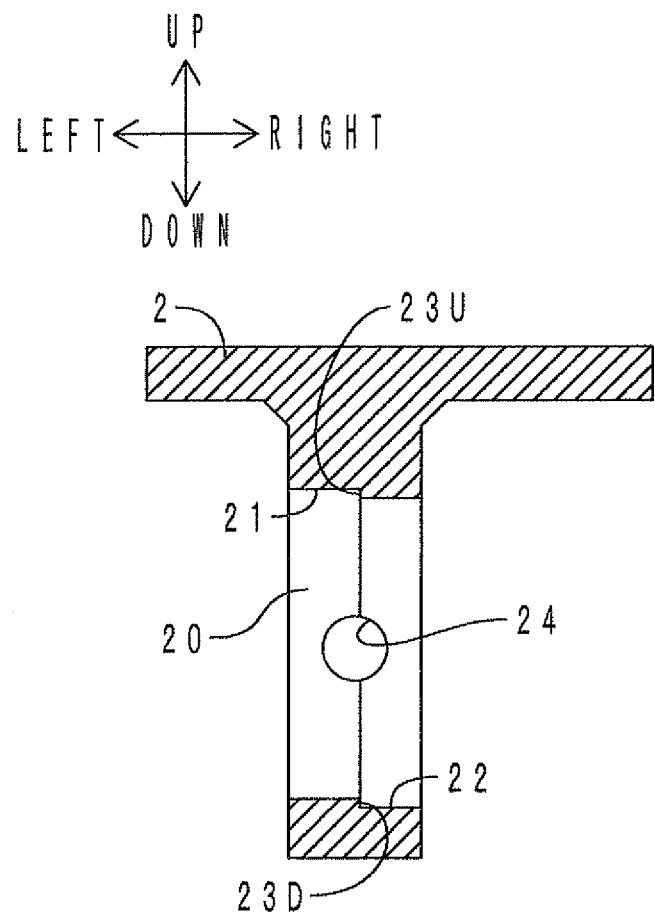
FIG. 12 is a schematic view showing a gas passage forming step of a method for manufacturing the flow control valve.
Figure 13:
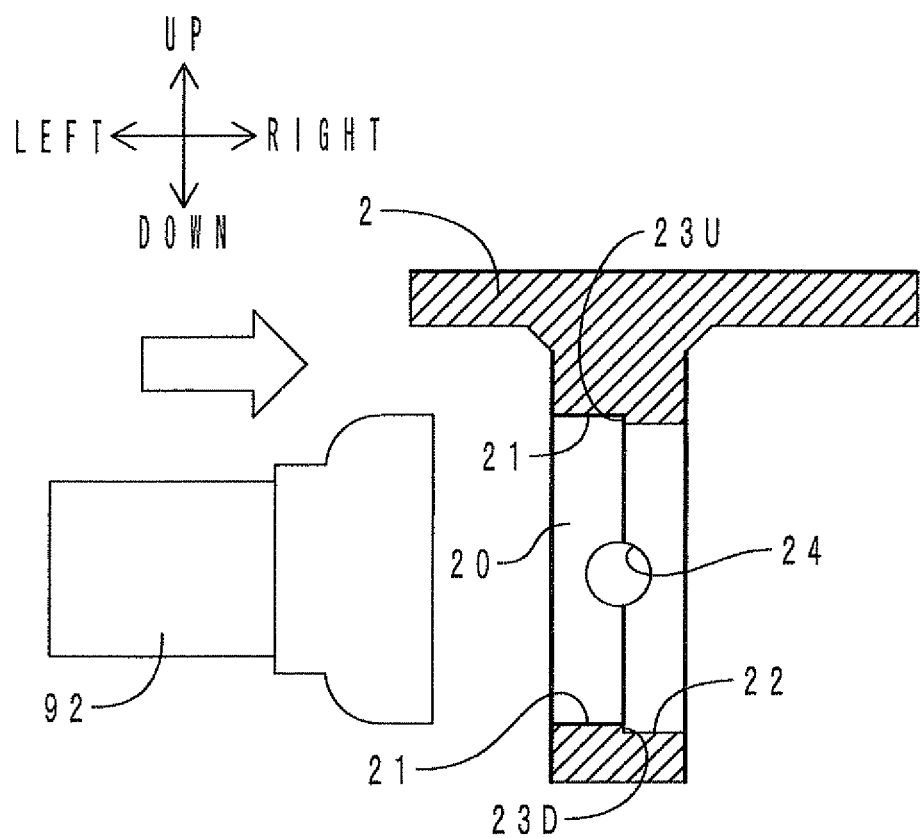
FIG. 13 is a schematic view showing a first cutting step of the manufacturing method.
Figure 15:
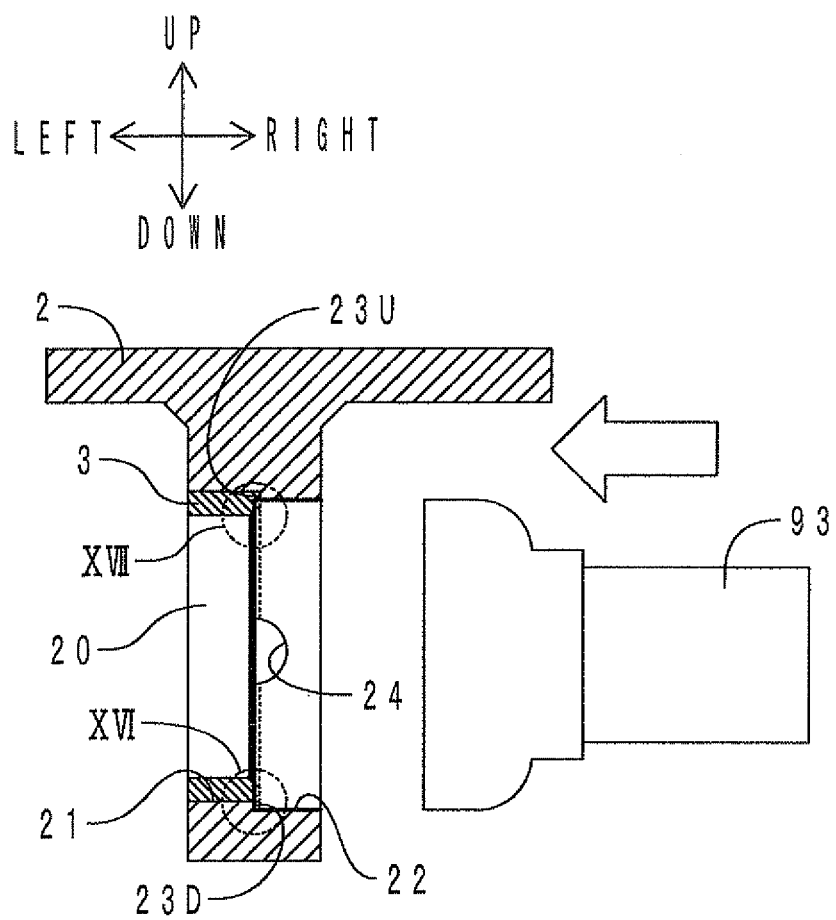
FIG. 15 is a schematic view showing a second cutting step of the manufacturing method.
Figure 16:
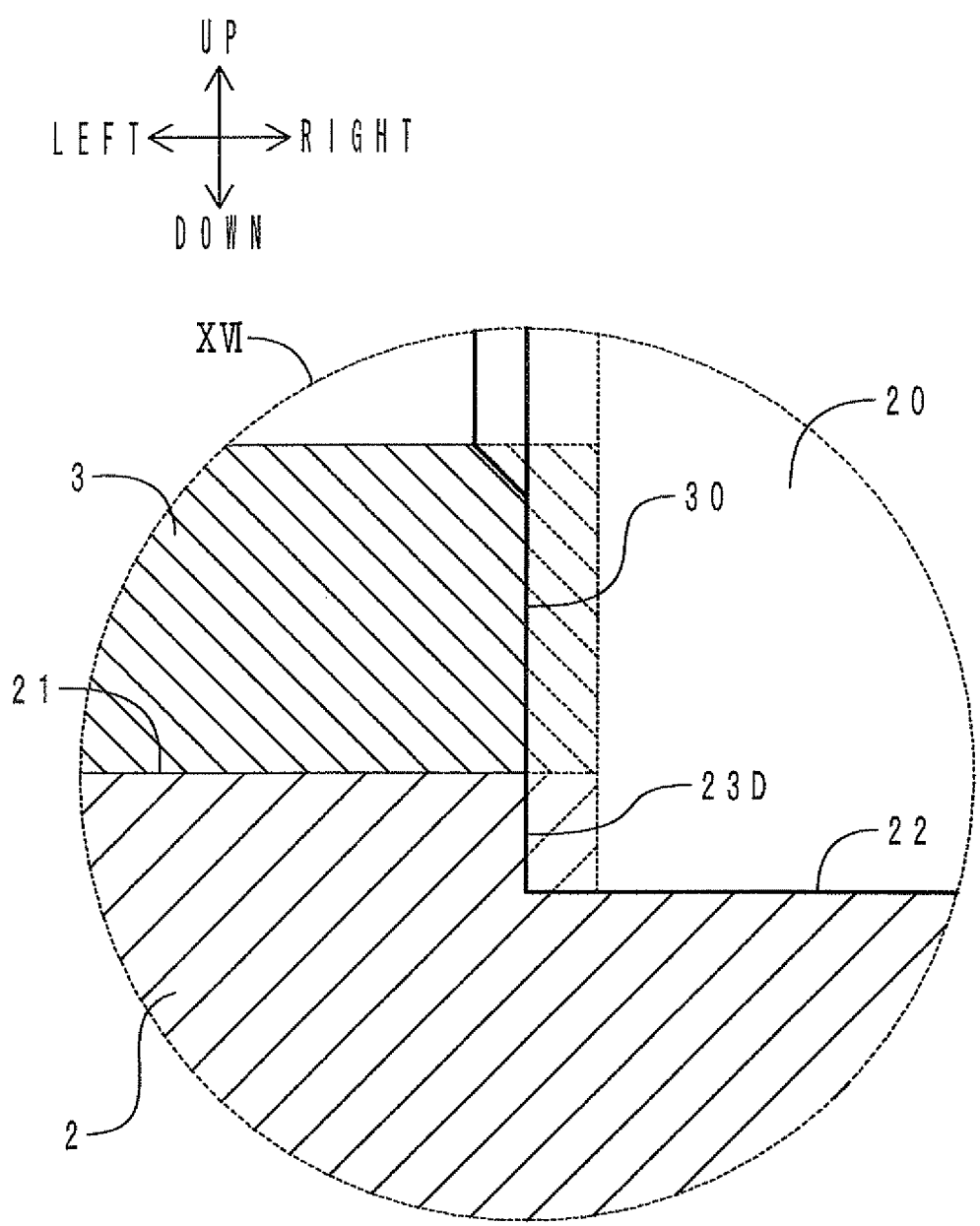
FIG. 16 is an enlarged view within a circle XVI shown in FIG. 15.
Figure 17:
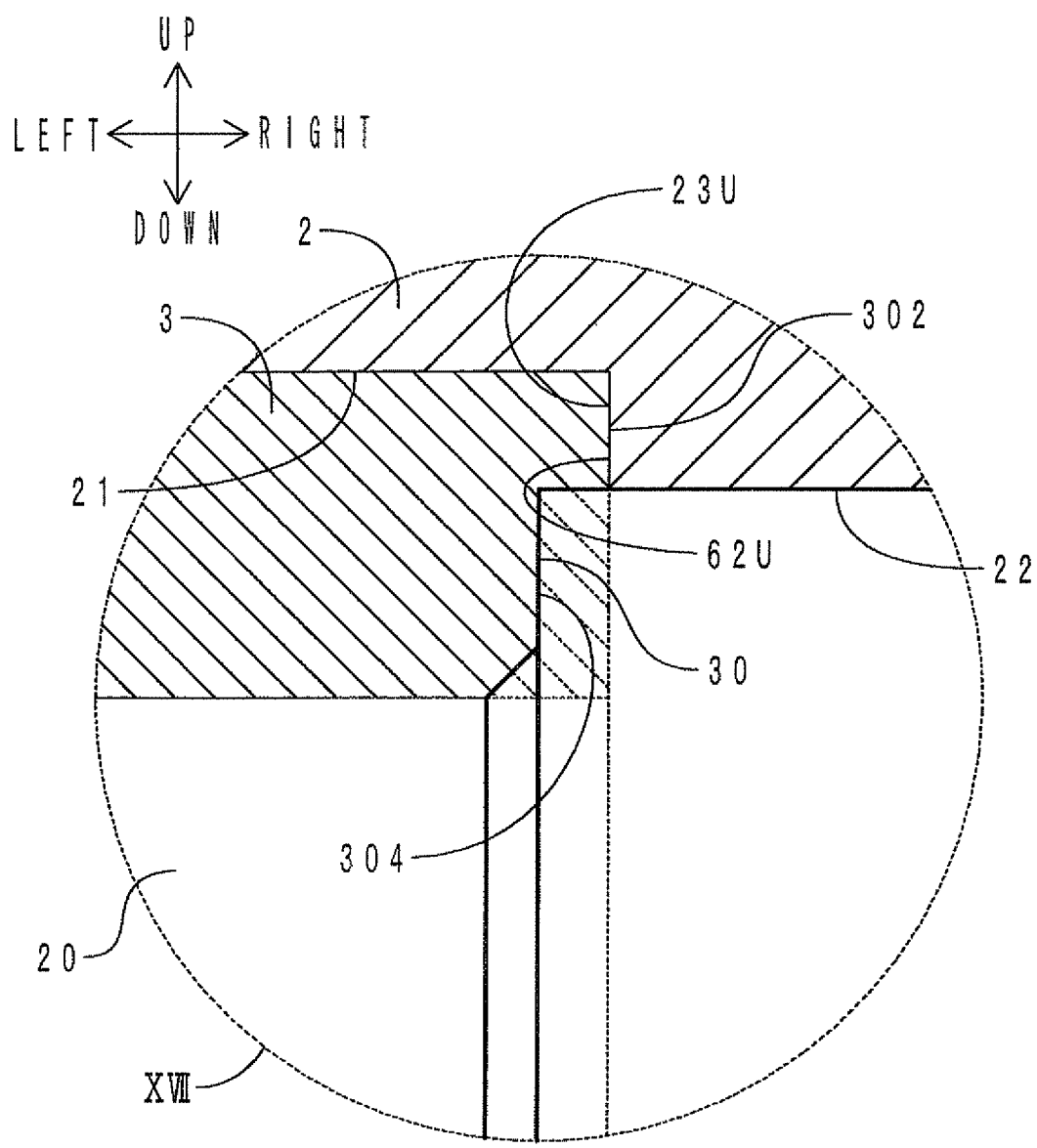
FIG. 17 is an enlarged view within a circle XVII shown in FIG. 15.
Figure 18:
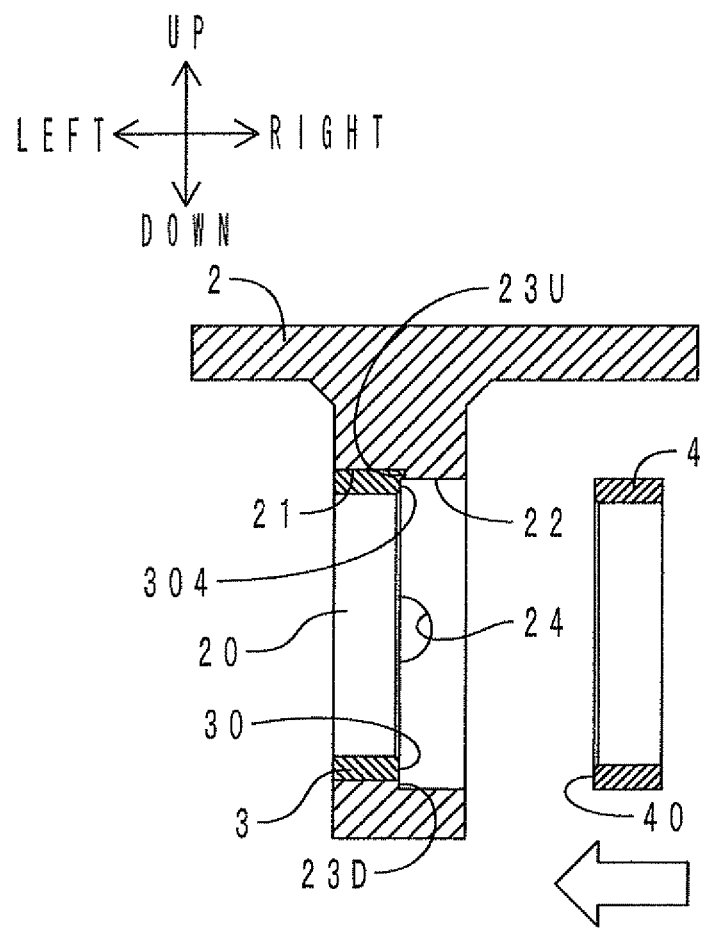
FIG. 18 is a schematic view showing a second cylinder member press-fitting step of the manufacturing method.

FIG. 12 shows a schematic view showing the gas passage forming step of the method for manufacturing the flow control valve of this embodiment. FIG. 13 shows a schematic view showing the first cutting step of the manufacturing method. FIG. 14 shows a schematic view showing the first cylinder member press-fitting step of the manufacturing method. FIG. 15 shows a schematic view showing the second cutting step of the manufacturing method. FIG. 16 shows an enlarged view within a circle XVI shown in FIG. 15. FIG. 17 shows an enlarged view within a circle XVII shown in FIG. 15. FIG. 18 shows a schematic view showing the second cylinder member press-fitting step of the manufacturing method. Note that portions corresponding to those in FIGS. 5 to 10 are shown by the same reference signs in the drawings.

In the gas passage forming step, as shown in FIG. 12, the housing 2 is prepared by casting. In the first cutting step, as shown by bold lines in FIG. 13, the attachment surfaces (upper surface, left surface, and right surface) of the housing 2 to which the adjacent members are attached are cut. In addition, the inner peripheral surface of the first cylinder member accommodating portion 21 is cut with a milling cutter 92. The milling cutter 92 is inserted into the first cylinder member accommodating portion 21 from a left end opening of the first cylinder member accommodating portion 21. In the first cylinder member press-fitting step, as shown in FIG. 14, the first cylinder member 3 is press-fitted into the first cylinder member accommodating portion 21 from the left end opening of the first cylinder member accommodating portion 21. The first cylinder member 3 is press-fitted until the first axial end surface 30 contacts with the radial step portion 23U.

In the second cutting step, as shown in FIG. 15, a milling cutter 93 is inserted into the second cylinder member accommodating portion 22 from the right end opening of the second cylinder member accommodating portion 22. As shown by bold lines in FIG. 15, the inner peripheral surface of the second cylinder member accommodating portion 22 is cut with the milling cutter 93. As shown in FIG. 16, the first axial end surface 30 and a surface of the radial step portion 23D are cut with the milling cutter 93. After the second cutting step, the first axial end surface 30 and the radial step portion 23D are cut so as to be approximately flush with each other. In addition, as shown in FIG. 17, a portion of the first axial end surface 30 protruding radially inward from the radial step portion 23U is cut with the milling cutter 93. This forms an indent portion 304 in the first axial end surface 30. Note that the depth (entire length in the left-right direction) of the indent portion 304 corresponds to a cut amount (see FIG. 16) of the radial step portion 23D with the milling cutter 93.

In the second cylinder member press-fitting step, as shown in FIG. 18, the second cylinder member 4 is press-fitted into the second cylinder member accommodating portion 22 from the right end opening of the second cylinder member accommodating portion 22. The second axial end surface 40 of the second cylinder member 4 makes surface contact with the radial step portion 23D and the first axial end surface 30 shown in FIG. 16. In addition, the second axial end surface 40 makes surface contact with a rightward-facing bottom surface (i.e., the first axial end surface 30) of the indent portion 304 shown in FIG. 17.

Then, cutout portions are formed respectively in the first cylinder member 3 and the second cylinder member 4 (see FIG. 2). Then, the shaft 51 is inserted to the shaft insertion hole 24. The valve main body 50 is mounted to the shaft 51 from the left end opening or the right end opening of the gas passage 20. In this manner, the flow control valve 1 of this embodiment is manufactured.

[Advantageous Effects]

Next, advantageous effects of the flow control valve 1 and the method for manufacturing the same of this embodiment will be described. The flow control valve 1 and the method for manufacturing the same of this embodiment have advantageous effects similar to those of the flow control valve and the method for manufacturing the same of the first embodiment regarding portions having common configurations.

Even when the press-fitting direction of the first cylinder member 3 and the press-fitting direction of the second cylinder member 4 with respect to the gas passage 20 are opposite as in the flow control valve 1 of this embodiment, the surface contact structure 62U can be ensured between the opposing portion 302 and the radial step portion 23U. In addition, the surface contact structure 62D can be ensured between the opposing portion 401 and the radial step portion 23D.

With the method for manufacturing the flow control valve 1 of this embodiment, the indent portion 304 is formed in the first cylinder member 3 in the second cutting step, as shown in FIG. 17. Therefore, despite the difference in positions of the radial step portions 23U and 23D in the left-right direction, the second axial end surface 40 of the second cylinder member 4 can make surface contact with the radial step portion 23D and the first axial end surface 30 shown in FIG. 16 in the second cylinder member press-fitting step. In addition, the second axial end surface 40 can make surface contact with the rightward-facing bottom surface of the indent portion 304 (i.e., the first axial end surface 30) shown in FIG. 17.

<Third Embodiment>

The difference of a flow control valve of this embodiment from the flow control valve of the first embodiment is that a filling structure is provided instead of the surface contact structure. The difference of a method for manufacturing a flow control valve of this embodiment from the method for manufacturing a flow control valve of the first embodiment is that the first cylinder member accommodating portion, the second cylinder member accommodating portion, and the radial step portion are cut in a single step. Thus, herein, only the differences will be mainly described.

(Configuration of Flow Control Valve)

Figure 19:
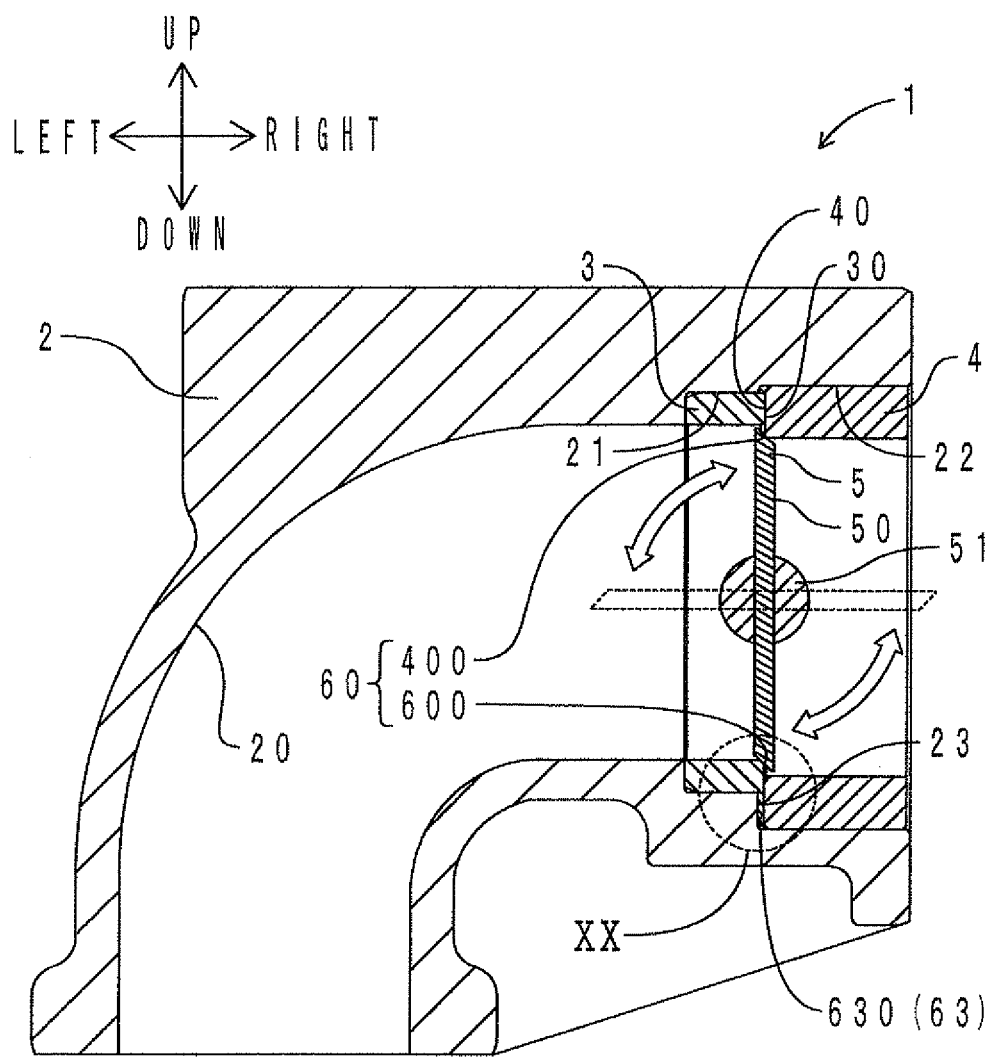
FIG. 19 is an axial sectional view of a flow control valve of a third embodiment.
Figure 20:
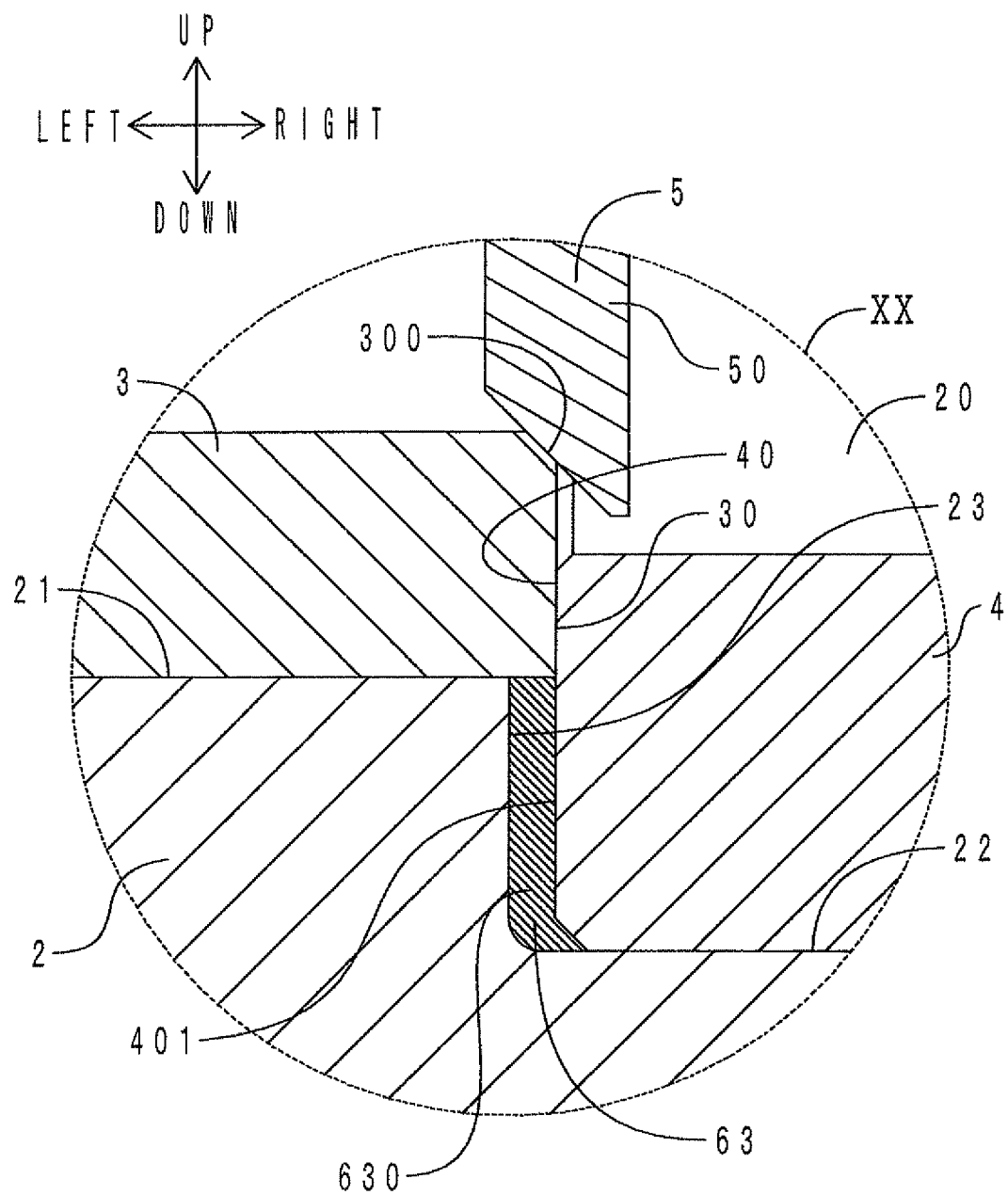
FIG. 20 is an enlarged view within a circle XX shown in FIG. 19.

First, the configuration of the flow control valve of this embodiment will be described. FIG. 19 shows an axial sectional view of the flow control valve of this embodiment. FIG. 20 shows an enlarged view within a circle XX shown in FIG. 19. Note that portions corresponding to those in FIGS. 3 and 4 are shown by the same reference signs in FIGS. 19 and 20.

As shown in FIGS. 19 and 20, a liquid filler 630 (Tetzsol 600 manufactured by Nippon Paint Co., Ltd.) is located in a gap between the opposing portion 401 and the radial step portion 23. In this manner, in the flow control valve 1 of this embodiment, a filling structure 63 is ensured by filling the gap between the opposing portion 401 and the radial step portion 23 with the filler 630.

(Method for Manufacturing Flow Control Valve)

Next, the method for manufacturing the flow control valve 1 of this embodiment will be described. The method for manufacturing the flow control valve 1 of this embodiment includes the gas passage forming step, an all-surface cutting step, the first cylinder member press-fitting step, a filler arranging step, and the second cylinder member press-fitting step.

Figure 22:
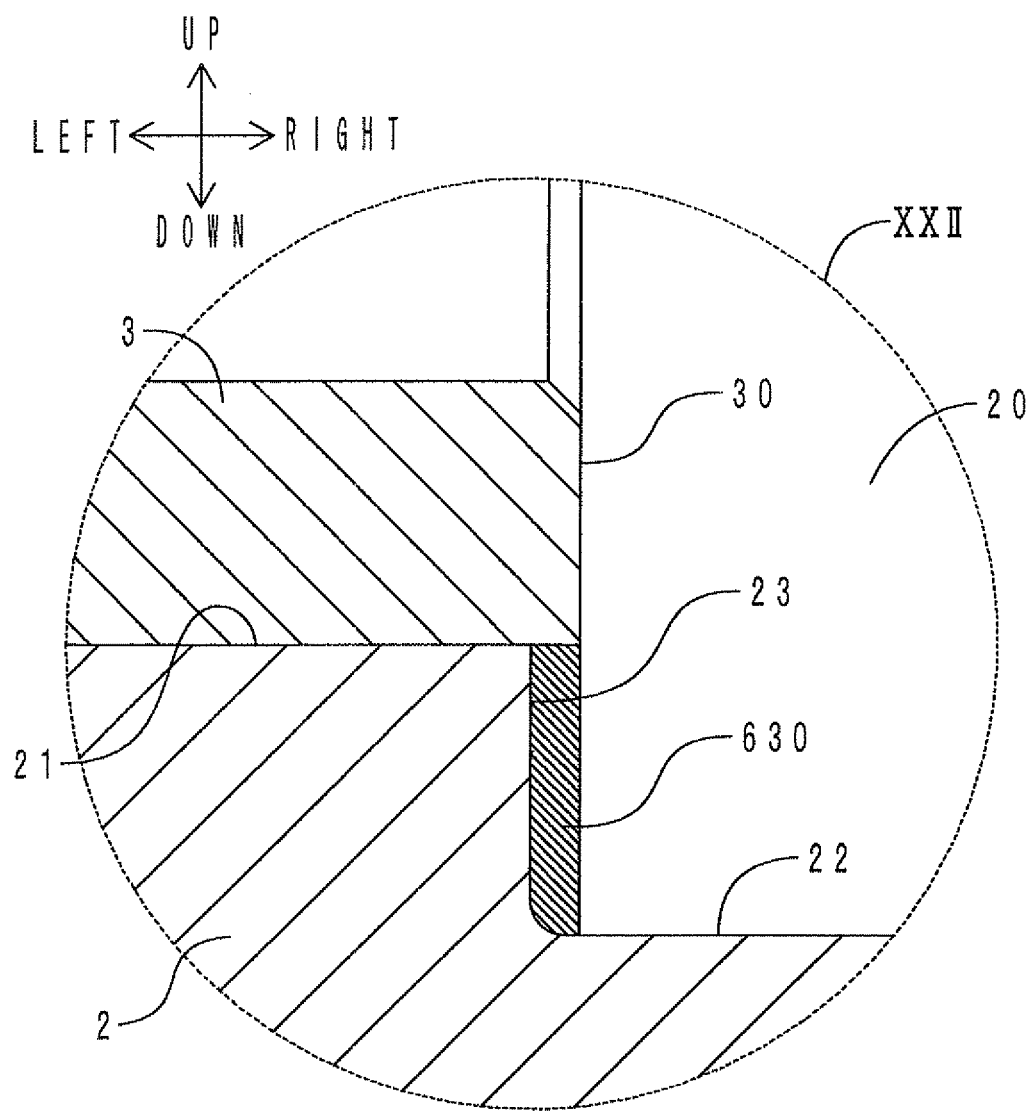
FIG. 22 is an enlarged view within a circle XXII shown in FIG. 21.

FIG. 21 shows a schematic view showing the filler arranging step of the method for manufacturing the flow control valve of this embodiment. FIG. 22 shows an enlarged view within a circle XXII shown in FIG. 21. Note that portions corresponding to those in FIGS. 5 to 10 are shown by the same reference signs in FIGS. 21 and 22.

In the gas passage forming step, the housing 2 is prepared by casting in a manner similar to that shown in FIG. 5. In the all-surface cutting step, the inner peripheral surface of the first cylinder member accommodating portion 21, the surface of the radial step portion 23, and the inner peripheral surface of the second cylinder member accommodating portion 22 are cut with a milling cutter in a manner similar to that shown in FIG. 6. In the first cylinder member press-fitting step, the first cylinder member 3 is press-fitted into the first cylinder member accommodating portion 21 in a manner similar to that shown in FIG. 7. In the filler arranging step, as shown in FIGS. 21 and 22, the filler 630 is applied to the surface of the radial step portion 23. In the second cylinder member press-fitting step, the second cylinder member 4 is press-fitted into the second cylinder member accommodating portion 22 in a manner similar to that shown in FIG. 10. As shown in FIG. 20, a gap between the opposing portion 401 and the radial step portion 23 is filled with the filler 630.

[Advantageous Effects]

Next, advantageous effects of the flow control valve 1 and the method for manufacturing the same of this embodiment will be described. The flow control valve 1 and the method for manufacturing the same of this embodiment have advantageous effects similar to those of the flow control valve and the method for manufacturing the same of the first embodiment regarding portions having common configurations.

With the method for manufacturing the flow control valve 1 of this embodiment, the filler 630 can be filled between the opposing portion 401 and the radial step portion 23 by bringing the second cylinder member 4 into contact with the first cylinder member 3 in the second cylinder member press-fitting step. That is, the gap between the opposing portion 401 and the radial step portion 23 can be filled. Therefore, a sulfuric acid-based condensate generated from exhaust gas does not easily enter between the opposing portion 401 and the radial step portion 23. Thus, the vicinity of the radial step portion 23 of the housing 2 formed of cast iron is less likely to be exposed to the condensate.

<Fourth Embodiment>

The difference of a flow control valve of this embodiment from the flow control valve of the first embodiment is that a surface contact-filling structure is provided instead of the surface contact structure. The difference of a method for manufacturing a flow control valve of this embodiment from the method for manufacturing a flow control valve of the first embodiment is that there is a filler arranging step between the second cutting step and the second cylinder member press-fitting step. Thus, herein, only the differences will be described.

Figure 23:
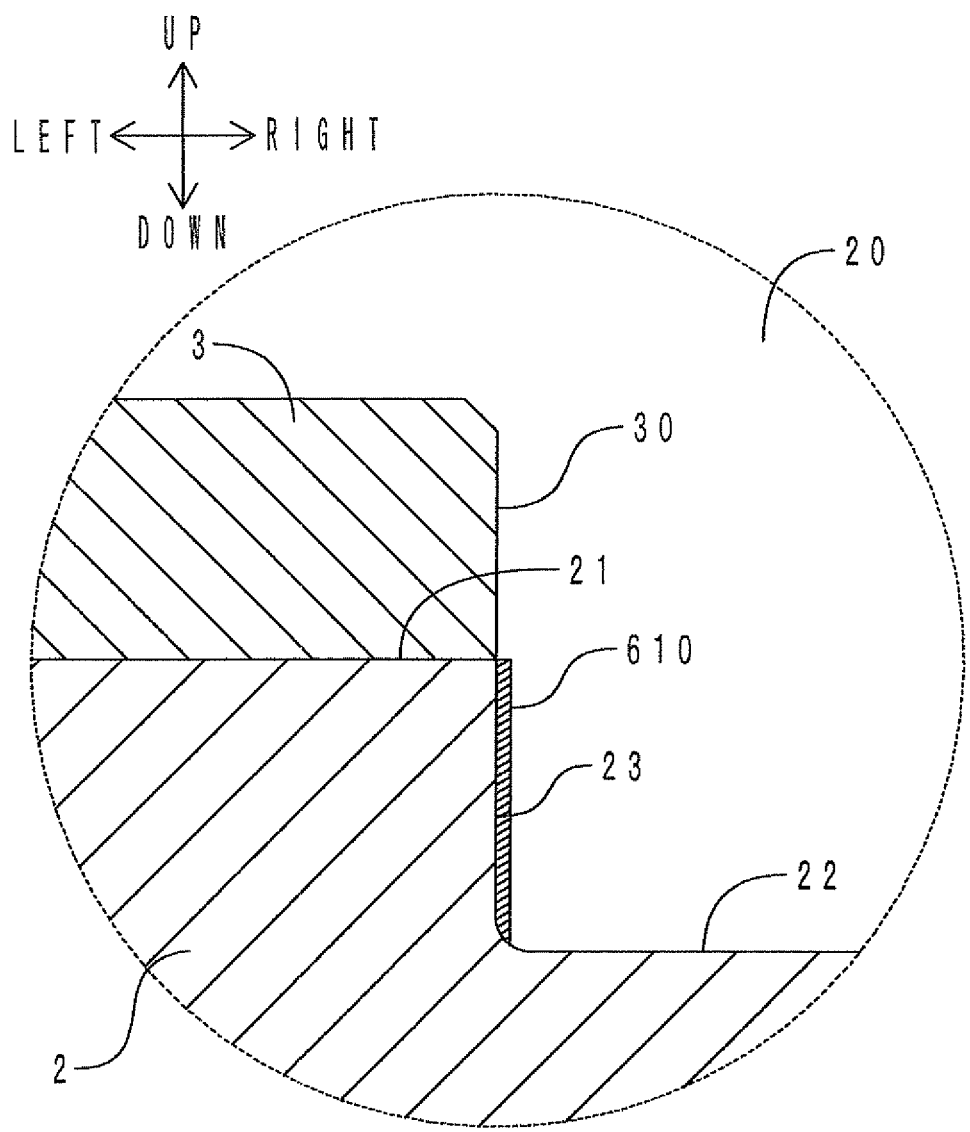
FIG. 23 is a schematic view showing a filler arranging step of a method for manufacturing a flow control valve of a fourth embodiment.

FIG. 23 shows a schematic view showing the filler arranging step of the method for manufacturing the flow control valve of this embodiment. Note that portions corresponding to those in FIG. 9 are shown by the same reference signs. In the second cutting step, as shown in FIG. 9, the radial step portion 23 is cut. In the filler arranging step, as shown in FIG. 23, a liquid filler 610 (Tetzsol 600 manufactured by Nippon Paint Co., Ltd.) is applied to the cut radial step portion 23 as described above. In the second cylinder member press-fitting step, as shown in FIG. 10, the second cylinder member is press-fitted into the second cylinder member accommodating portion.

With the flow control valve of this embodiment, the liquid filler 610 is located between the opposing portion 401 and the radial step portion 23 shown in FIG. 4. That is, in the flow control valve of this embodiment, the surface contact-filling structure is ensured by bringing the opposing portion 401 into surface contact with the radial step portion 23 with the filler 610 interposed therebetween.

The flow control valve and the method for manufacturing the same of this embodiment have advantageous effects similar to those of the flow control valve and the method for manufacturing the same of the first embodiment regarding portions having common configurations. In the flow control valve of this embodiment, the liquid filler 610 is located between the opposing portion 401 and the radial step portion 23. This makes it possible to more reliably seal between the opposing portion 401 and the radial step portion 23.

<Other Embodiments>

The embodiments of the flow control valve 1 and the method for manufacturing the same of the present invention have been described above. However, embodiments are not particularly limited to those described above. The present invention may be embodied with various modifications and improvements that can be made by those skilled in the art. For example, the housing 2 is formed of ductile cast iron in the flow control valve 1 of the embodiments described above, but may be formed of gray cast iron (FC). The first cylinder member 3 and the second cylinder member 4 are formed of stainless steel in the flow control valve 1 of the embodiments described above, but may be formed of aluminum alloy. The surfaces of the first cylinder member 3 and the second cylinder member 4 formed of cast iron may be covered with plating, coating material, or the like having higher corrosion resistance than that of cast iron.

The material of the fillers 610 and 630 is not also particularly limited. A gel filler or a solid filler may also be used in addition to the liquid filler. A paint material may also be used as the fillers 610 and 630. For example, a silicone-based heat resistant paint material (e.g., TB 1207 manufactured by ThreeBond Co., Ltd.) may be used.

EXAMPLE

A corrosion resistance test conducted for the flow control valve of the present invention will be described below. A sample of an example, i.e., the flow control valve used in the test, was the flow control valve 1 of the first embodiment shown in FIGS. 1 to 4. That is, in the flow control valve used in the test, the gap between the opposing portion 401 and the radial step portion 23 had been eliminated almost entirely. The cut amount in the axial direction (entire length of a portion shown by dotted lines in FIG. 9 in the left-right direction) of the radial step portion 23 and the first axial end surface 30 in the second cutting step was 1 mm.

Note that a flow control valve used as a sample of a reference example (however, the flow control valve of the reference example is not publicly known) includes the housing 2 formed of ductile cast iron and the first cylinder member 3 and the second cylinder member 4 formed of stainless steel, but is formed with a gap between the opposing portion 401 and the radial step portion 23.

The corrosion resistance test was conducted assuming a situation where the flow control valve is used in an actual vehicle. As the corrosive substance, sulfuric acid corrosive liquid (pH 2.3±0.1) was used assuming a condensate of exhaust gas from a diesel engine. The corrosion resistance test was conducted by repeating a cycle of (A) to (D) six times, each cycle sequence consisting of (A) immersing the sample in sulfuric acid corrosive liquid which is vibrating according to the supersonic at normal temperature for 15 minutes, (B) then immersing the sample in sulfuric acid corrosive liquid at 80° C. for 25 minutes, (C) subsequently drying the sample in the air at 200° C. for 60 minutes, and then (D) cooling the sample in the air at 10° C. for 20 minutes, and finally (E) leaving the sample in the air at normal temperature for 12 hours (i.e., [(A)→(B)→(C)→(D)]×6→(E)).

Figure 24:
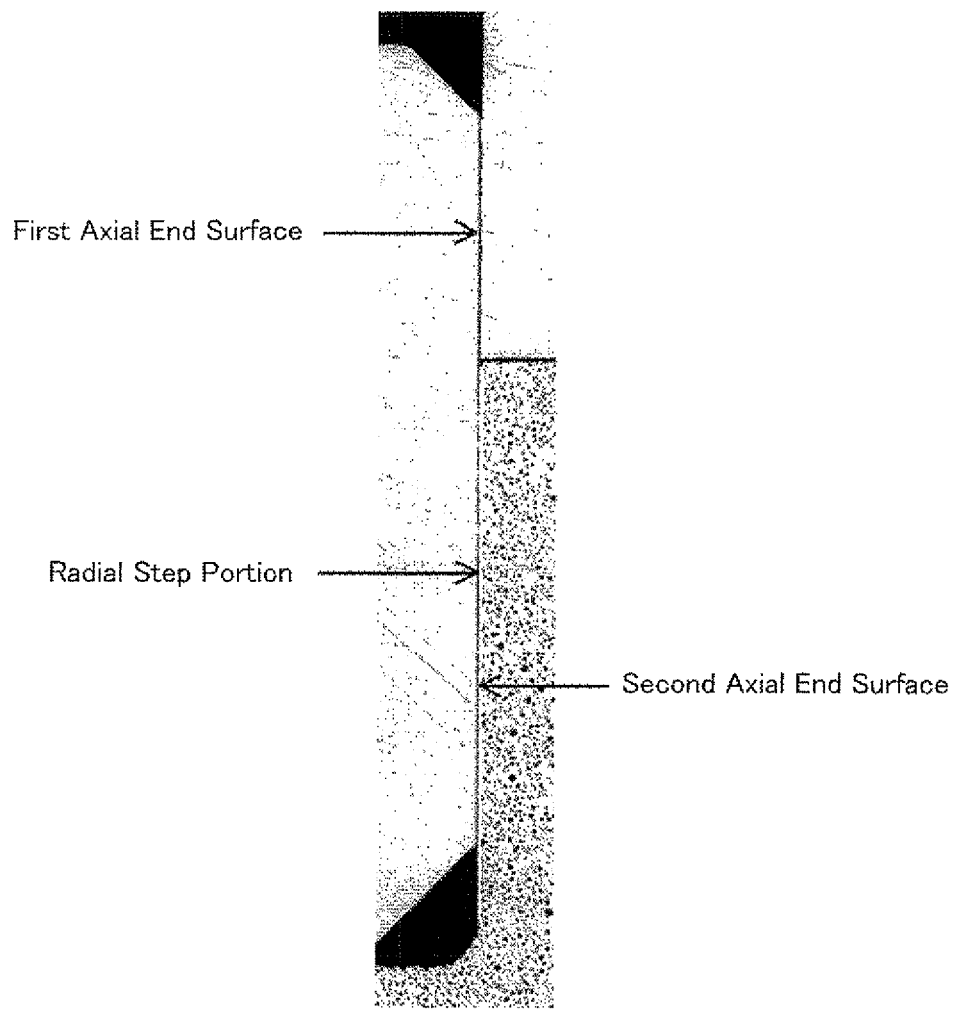
FIG. 24 is an enlarged sectional photograph showing a vicinity of a radial step portion of a sample of an example after a corrosion resistance test.
Figure 25:
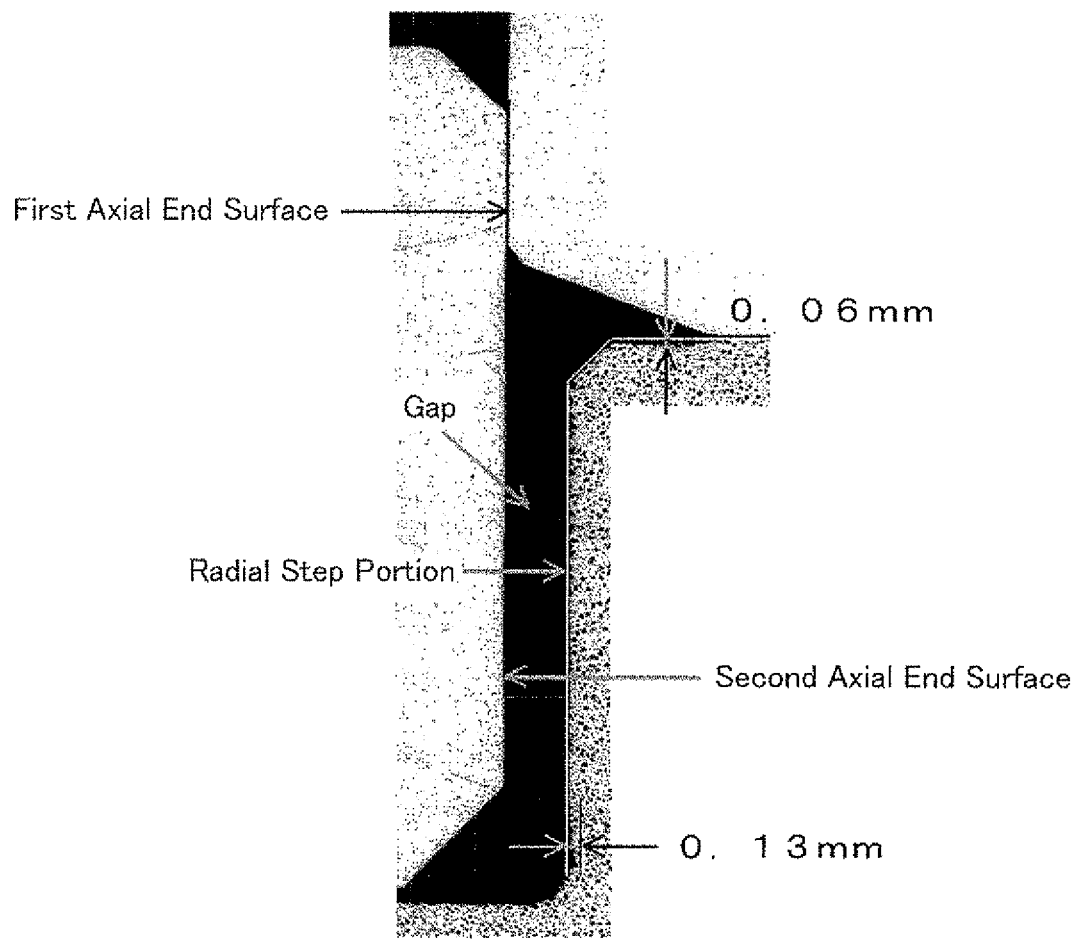
FIG. 25 is an enlarged sectional photograph showing a vicinity of a radial step portion of a sample of a reference example after a corrosion resistance test.
Figure 26:
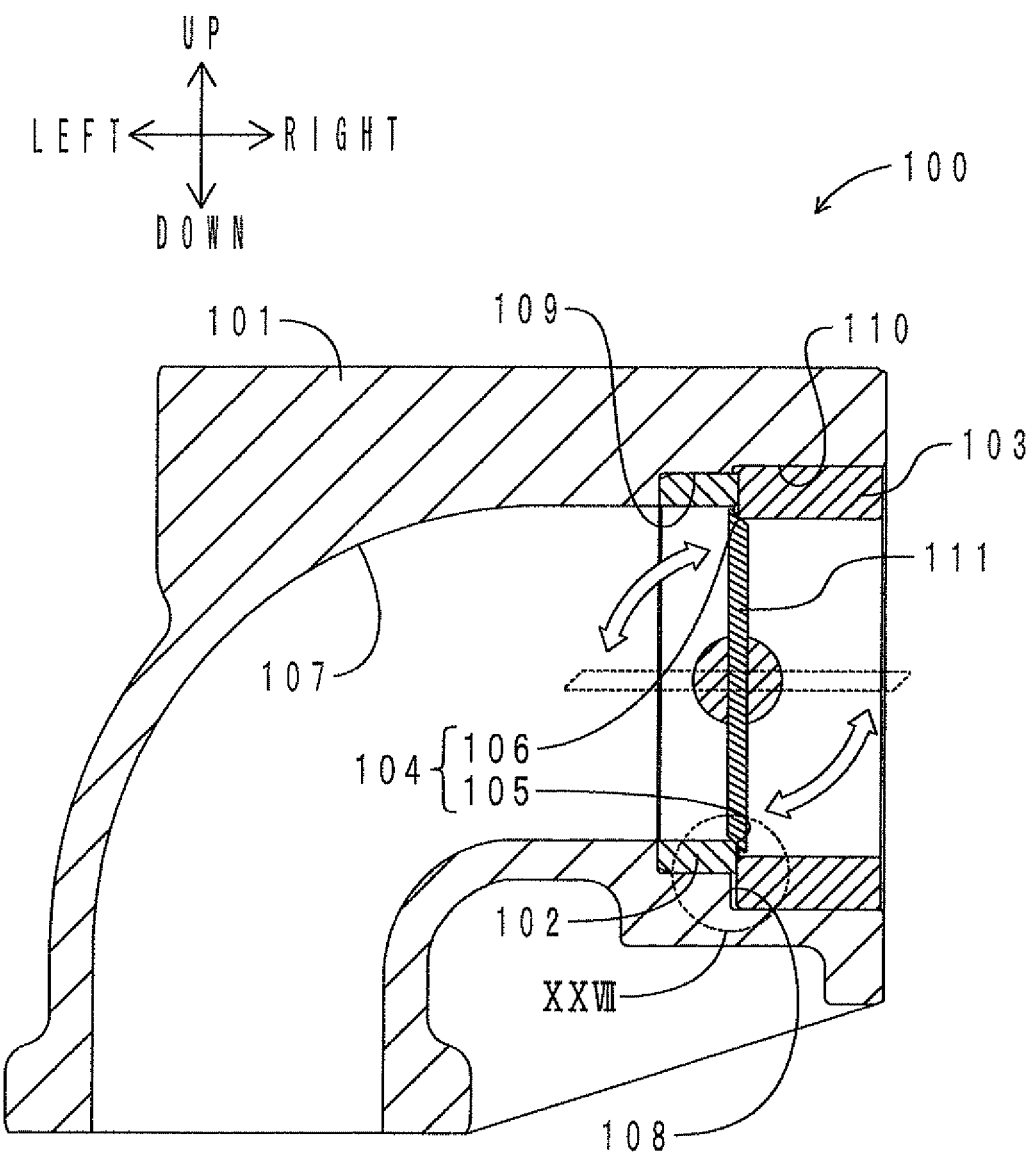
FIG. 26 is a sectional view of a flow control valve in the related art.
Figure 27:
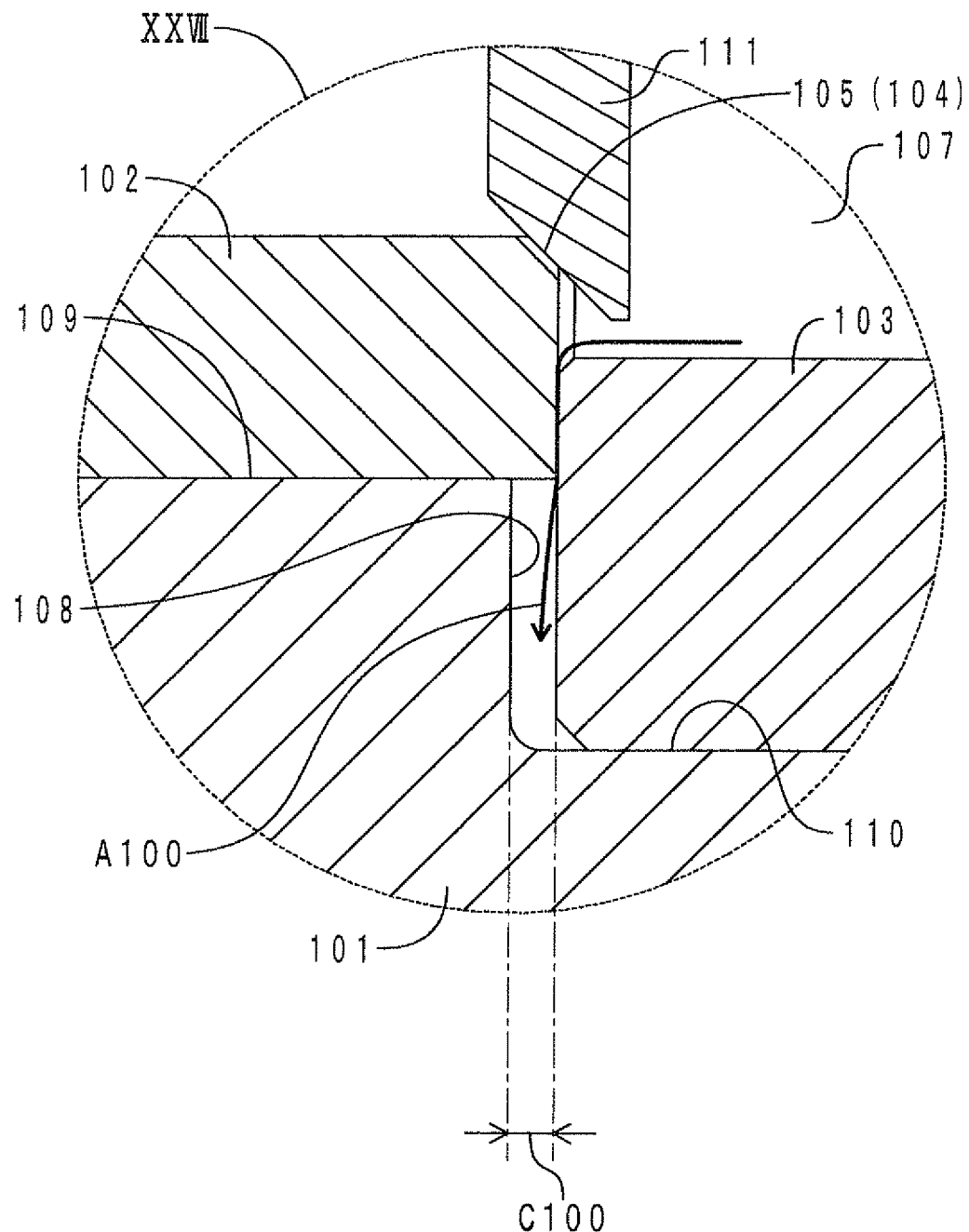
FIG. 27 is an enlarged view within a circle XXVII shown in FIG. 26.

FIG. 24 shows an enlarged sectional photograph of a vicinity of a radial step portion in the sample of the example after the corrosion resistance test. FIG. 25 shows an enlarged sectional photograph of a vicinity of a radial step portion in the sample of the reference example after the corrosion resistance test. As shown in FIG. 25, in the case of the sample of the reference example, a gap is formed between the second axial end surface of the second cylinder member and the radial step portion. Therefore, the radial step portion corrodes. Specifically, corrosion sized as 0.13 mm at maximum can be observed in the radial step portion. Also, corrosion sized as 0.06 mm at maximum can be observed in the first cylinder member accommodating portion in the gas passage.

In contrast, as shown in FIG. 24, in the case of the sample of the example, a gap is not formed between the second axial end surface of the second cylinder member and the radial step portion. Therefore, the radial step portion does not corrode. The first cylinder member accommodating portion in the gas passage does not corrode either. As described herein, the vicinity of the radial step portion of the housing in the sample of the example is less likely to corrode, compared to that in the sample of the reference example.

REFERENCE SIGNS LIST

1: flow control valve, 2: housing, 3: first cylinder member, 4: second cylinder member, 5: valve body.

20: gas passage, 21: first cylinder member accommodating portion, 22: second cylinder member accommodating portion, 23: radial step portion, 23D: radial step portion, 23U: radial step portion, 24: shaft insertion hole, 30: first axial end surface, 40: second axial end surface, 50: valve main body, 51: shaft, 60: valve seat, 61: surface contact structure, 62D: surface contact structure, 62U: surface contact structure, 63: filling structure, 90: milling cutter, 91: milling cutter, 92: milling cutter, 93: milling cutter.

300: first area, 302: opposing portion, 303: cutout portion, 304: indent portion, 400: second area, 401: opposing portion, 403: cutout portion, 610: filler, 630: filler.

The invention claimed is:

1. A method for manufacturing a flow control valve, comprising:
 a gas passage forming step of forming in a housing formed of cast iron a gas passage through which gas that generates a corrosive substance passes, the gas passage including a first cylinder member accommodating portion, a second cylinder member accommodating portion arranged adjacent to the first cylinder member accommodating portion in an axial direction, and a radial step portion located between the first cylinder member accommodating portion and the second cylinder member accommodating portion;
 a first cutting step of cutting at least the first cylinder member accommodating portion;
 a first cylinder member press-fitting step of press-fitting in the axial direction a first cylinder member, which includes a first axial end surface and a surface formed of a highly corrosion resistant material having higher corrosion resistance against the corrosive substance than corrosion resistance of cast iron, into the cut first cylinder member accommodating portion;
 a second cutting step of cutting the first axial end surface and the radial step portion so as to be approximately flush with each other by simultaneously cutting at least the first axial end surface and the radial step portion among the first axial end surface, the radial step portion, and the second cylinder member accommodating portion; and
 a second cylinder member press-fitting step of press-fitting in the axial direction a second cylinder member, which includes a surface formed of the highly corrosion resistant material and a second axial end surface, into the cut second cylinder member accommodating portion such that the second axial end surface comes into contact with the first axial end surface and the radial step portion.

2. The method for manufacturing the flow control valve according to claim 1, further comprising a filler arranging step of arranging a filler at least in the radial step portion between the second cutting step and the second cylinder member press-fitting step.

3. A method for manufacturing a flow control valve, comprising:
 a gas passage forming step of forming in a housing formed of cast iron a gas passage through which gas that generates a corrosive substance passes, the gas passage including a first cylinder member accommodating portion, a second cylinder member accommodating portion arranged adjacent to the first cylinder member accommodating portion in an axial direction, and a radial step portion located between the first cylinder member accommodating portion and the second cylinder member accommodating portion;

an all-surface cutting step of cutting the first cylinder member accommodating portion, the second cylinder member accommodating portion, and the radial step portion;

a first cylinder member press-fitting step of press-fitting in the axial direction a first cylinder member, which includes a first axial end surface and a surface formed of a highly corrosion resistant material having higher corrosion resistance against the corrosive substance than corrosion resistance of cast iron, into the cut first cylinder member accommodating portion;

a filler arranging step of arranging a filler at least in the radial step portion; and a second cylinder member press-fitting step of press-fitting in the axial direction a second cylinder member, which includes a surface formed of the highly corrosion resistant material and a second axial end surface, into the cut second cylinder member accommodating portion such that the second axial end surface comes into contact with the first axial end surface and the filler.

4. A flow control valve, comprising:

a housing formed with a gas passage through which gas that generates a corrosive substance passes, the gas passage including a first cylinder member accommodating portion, a second cylinder member accommodating portion arranged adjacent to the first cylinder member accommodating portion in an axial direction, and a radial step portion located between the first cylinder member accommodating portion and the second cylinder member accommodating portion;

a first cylinder member that is accommodated in the first cylinder member accommodating portion and includes a first axial end surface;

a second cylinder member that is accommodated in the second cylinder member accommodating portion and includes a second axial end surface that contacts with the first axial end surface in the axial direction in a state where inner peripheries of the first axial end surface and the second axial end surface are displaced with each other in a radial direction; and a valve body that is rotatably arranged inside the first cylinder member and the second cylinder member in the radial direction and that opens and closes the gas passage by detaching from and attaching to a valve seat arranged on a pair of the inner peripheries, wherein the housing is formed of cast iron, at least surfaces of the first cylinder member and the second cylinder member are formed of a highly corrosion resistant material having higher corrosion resistance against the corrosive substance than corrosion resistance of cast iron, at least one of the first axial end surface and the second axial end surface includes an opposing portion that opposes the radial step portion in the axial direction, and a gas seal structure that suppresses entry of the corrosive substance between the opposing portion and the radial step portion is arranged between the opposing portion and the radial step portion.

5. The flow control valve according to claim 4, wherein the gas seal structure is a surface contact structure that eliminates a gap between the opposing portion and the radial step portion almost entirely.

6. The flow control valve according to claim 5, wherein the gas seal structure is a filling structure in which a gap between the opposing portion and the radial step portion is filled with a filler.

7. The flow control valve according to claim 4, wherein the gas seal structure is a filling structure in which a gap between the opposing portion and the radial step portion is filled with a filler.

* * * * *